(12) United States Patent
Takayama

(10) Patent No.: US 8,679,400 B2
(45) Date of Patent: Mar. 25, 2014

(54) SINTERED MATERIAL, FERROUS SINTERED SLIDING MATERIAL, PRODUCING METHOD OF THE SAME, SLIDING MEMBER, PRODUCING METHOD OF THE SAME AND COUPLING DEVICE

(75) Inventor: Takemori Takayama, Hirakata (JP)

(73) Assignee: Komatsu Ltd, Tokyo (JP)

( * ) Notice: Subject to any disclaimer, the term of this patent is extended or adjusted under 35 U.S.C. 154(b) by 0 days.

(21) Appl. No.: 13/412,825

(22) Filed: Mar. 6, 2012

(65) Prior Publication Data

US 2012/0177528 A1 Jul. 12, 2012

Related U.S. Application Data

(62) Division of application No. 11/883,330, filed as application No. PCT/JP2006/001710 on Jan. 26, 2006, now abandoned.

(30) Foreign Application Priority Data

Jan. 31, 2005 (JP) ................................ 2005-023844

(51) Int. Cl.
*B22F 1/00* (2006.01)
(52) U.S. Cl.
USPC ............... 419/32; 419/11; 419/38; 419/47; 228/199; 508/103; 508/105; 75/236
(58) Field of Classification Search
USPC ............................................. 75/236; 419/32
See application file for complete search history.

(56) References Cited

U.S. PATENT DOCUMENTS

| 4,268,309 A | 5/1981 | Serino et al. |
| 5,158,601 A | 10/1992 | Fujiki et al. |
| 5,482,782 A * | 1/1996 | Tanaka et al. ................. 428/553 |

(Continued)

FOREIGN PATENT DOCUMENTS

| GB | 2 109 004 | 8/1982 |
| JP | 58-157951 | 9/1983 |

(Continued)

OTHER PUBLICATIONS

Japanese Office Action (with English translation) issued Aug. 27, 2010 in corresponding Japanese Application No. 2007-500659.

(Continued)

*Primary Examiner* — Jessee Roe
*Assistant Examiner* — Christopher Kessler
(74) *Attorney, Agent, or Firm* — Wenderoth, Lind & Ponack, L.L.P.

(57) ABSTRACT

An iron-based sintered sliding material includes: a sintered structure which contains 10-50 wt. % copper and 1-15 wt. % carbon and has been formed by sintering a powder mixture obtained by mixing at least one of an Fe—Cu alloy powder containing copper in an amount which is the solid solubility or larger and is 5-50 wt. %, excluding 50 wt. %, and an Fe—Cu—C alloy powder containing copper in an amount which is the solid solubility or larger and is 5-50 wt. %, excluding 50 wt. %, and containing carbon in an amount of 0-5 wt. %, excluding 0 wt. %, with a graphite powder and at least one of a copper powder and a copper alloy powder; and graphite particles dispersed in the sintered sliding material in an amount of 1-14 wt. % or 3-50 vol. %.

5 Claims, 20 Drawing Sheets

(56) References Cited

U.S. PATENT DOCUMENTS

| | | |
|---|---|---|
| 6,086,257 A | 7/2000 | Lee |
| 2002/0172836 A1 | 11/2002 | Takayama et al. |
| 2004/0108597 A1 | 6/2004 | Ishida et al. |

FOREIGN PATENT DOCUMENTS

| | | |
|---|---|---|
| JP | 01-255631 | 10/1989 |
| JP | 4-254556 | 9/1992 |
| JP | 4-259351 | 9/1992 |
| JP | 6-346183 | 12/1994 |
| JP | 8-109450 | 4/1996 |
| JP | 9-95759 | 4/1997 |
| JP | 11-229001 | 8/1999 |
| JP | 3168538 | 3/2001 |
| JP | 2002-180216 | 6/2002 |
| JP | 2003-73755 | 3/2003 |
| JP | 2003-342700 | 12/2003 |
| WO | 02/070762 | 9/2002 |

OTHER PUBLICATIONS

The Association of Powder Process Industry & Engineering, Japan, "Sintered Machine Parts—Design and Production-", GIJUTUSHOIN, Oct. 12, 1987, pp. 327-341.

UK Examination Report issued Apr. 22, 2010 in connection with corresponding Great Britain Application No. 0714729.1.

\* cited by examiner

FIG. 3
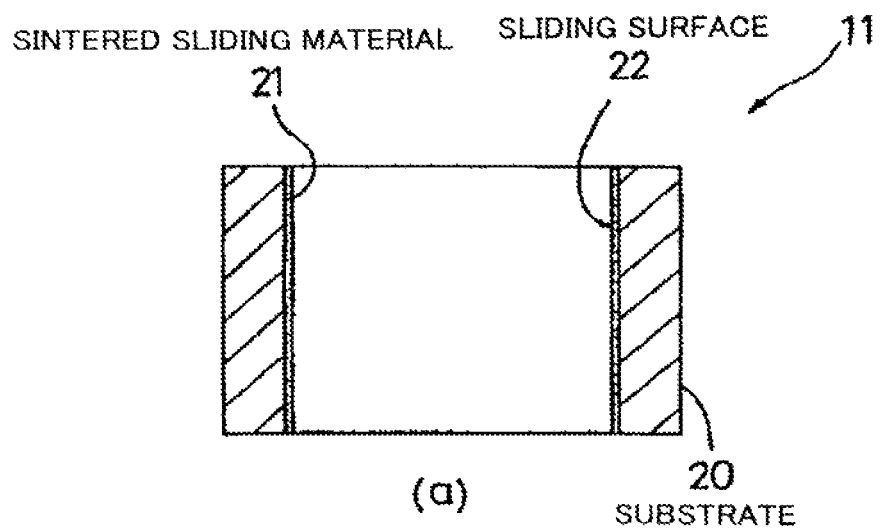
(a)
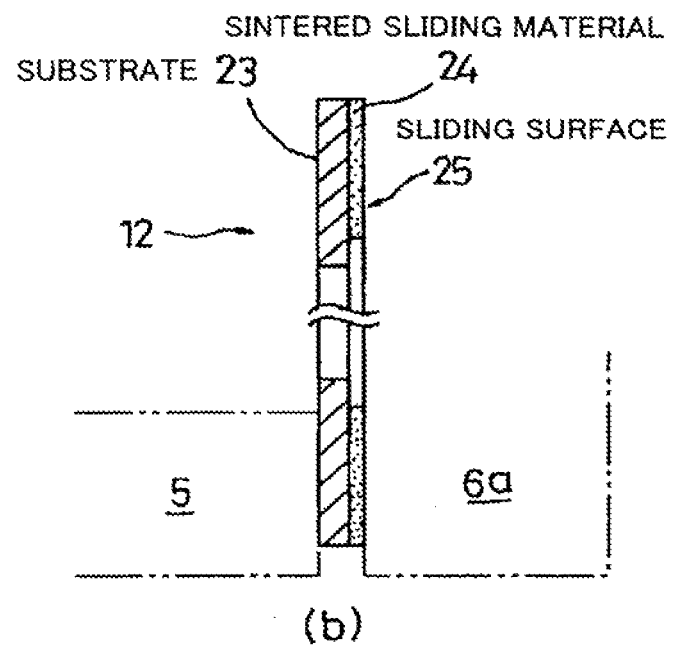
(b)

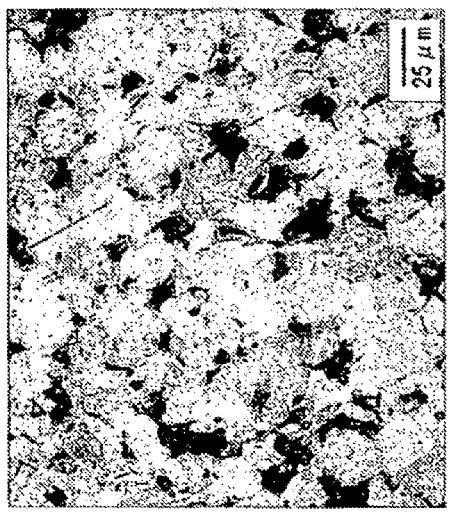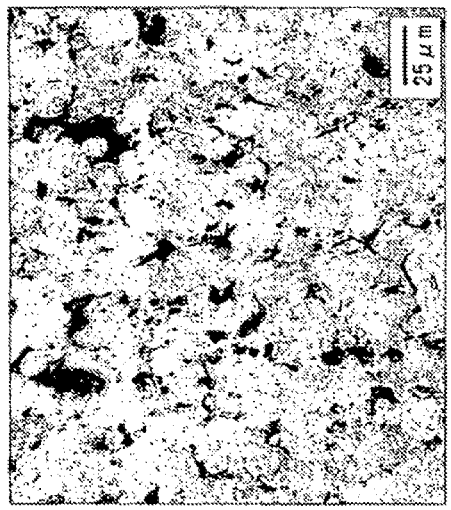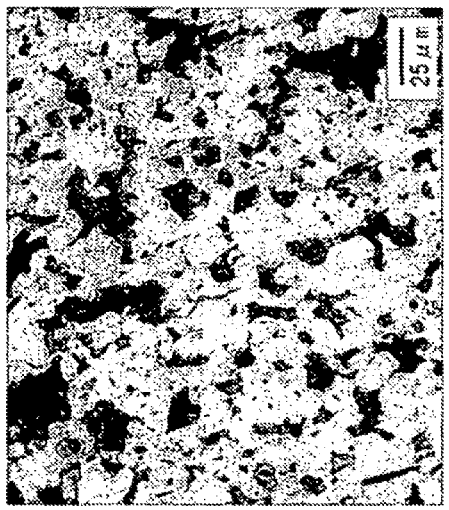
FIG. 6

FIG. 7
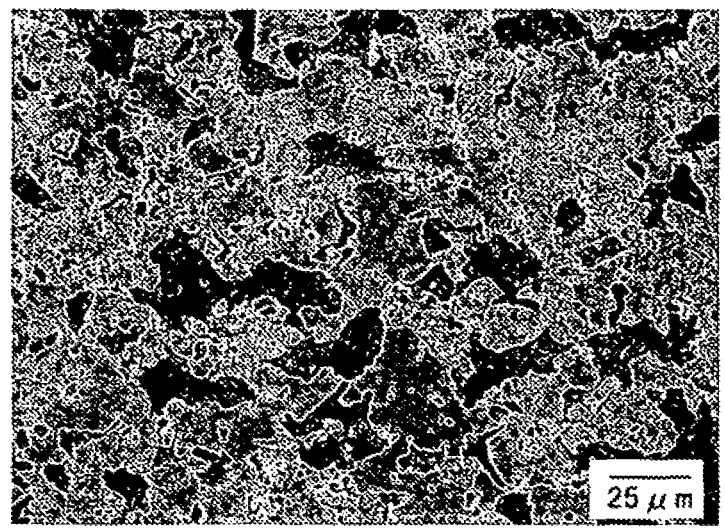
No.8(Fe16Al25Cu−4Gr)
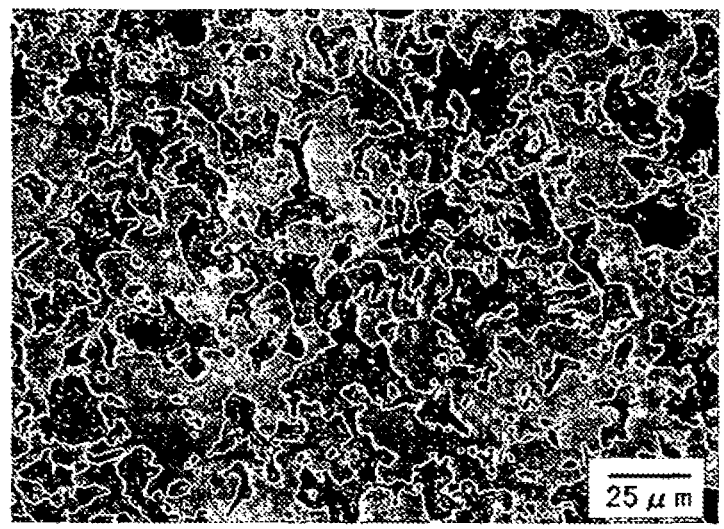
No.11(Fe16Al25Cu−7Gr)

FIG. 8
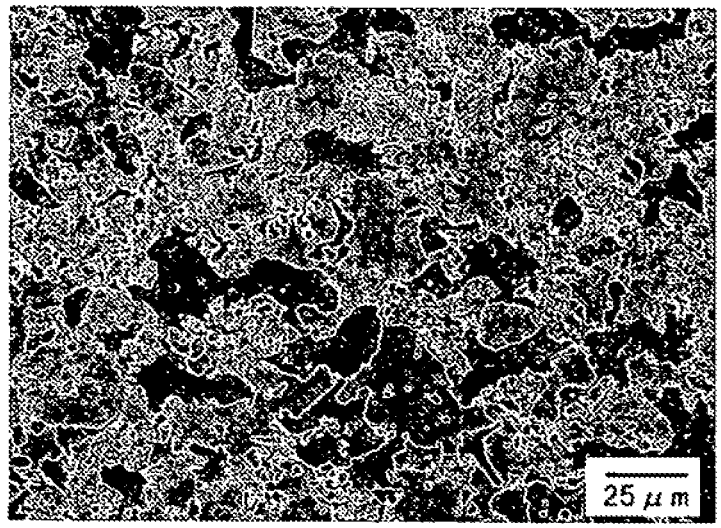
1200°C, No.8(Fe16Al25Cu-4Gr)
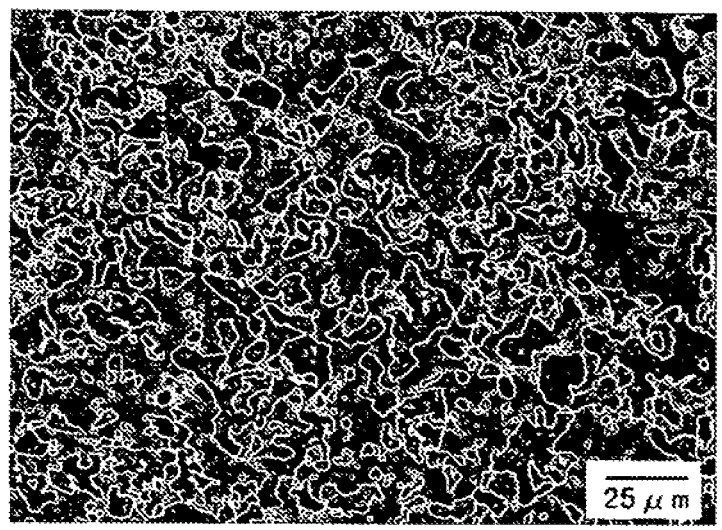
1100°C, No.8(Fe16Al25Cu-4Gr)

1000°C, No.8(Fe16Al25Cu-4Gr)

No.15(Fe-63Fe16Al-25Cu-1.2C, 1200°C)
(Fe-10Al-25Cu-1.2C)

FIG. 12
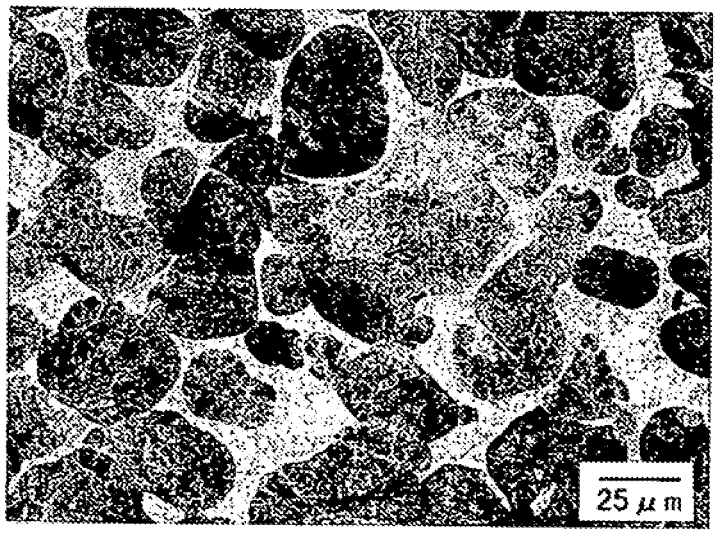
(a)
No.18(Fe-30Cu-0.6C, 1200°C)
(Fe-30Cu-0.6C)
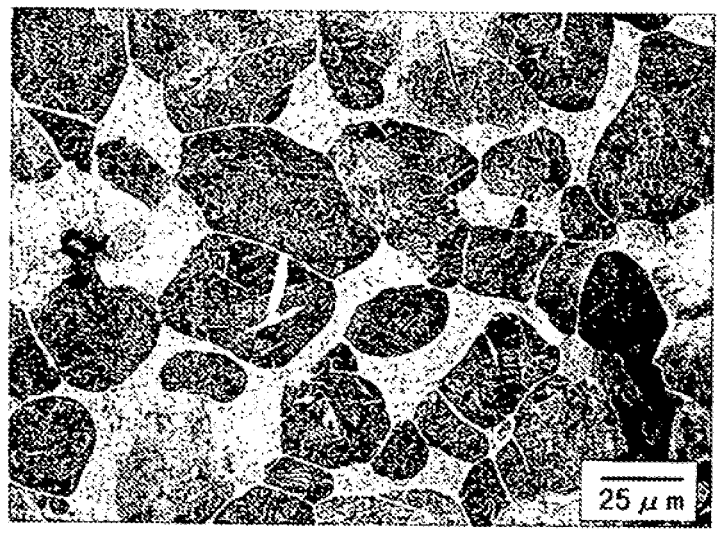
(b)
No.19(Fe-30Cu-1.2C, 1200°C)
(Fe-30Cu-1.2C)

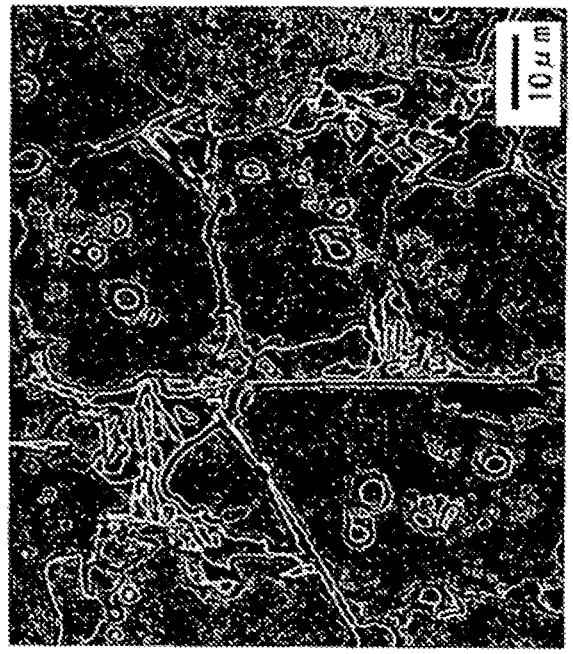
No. 53
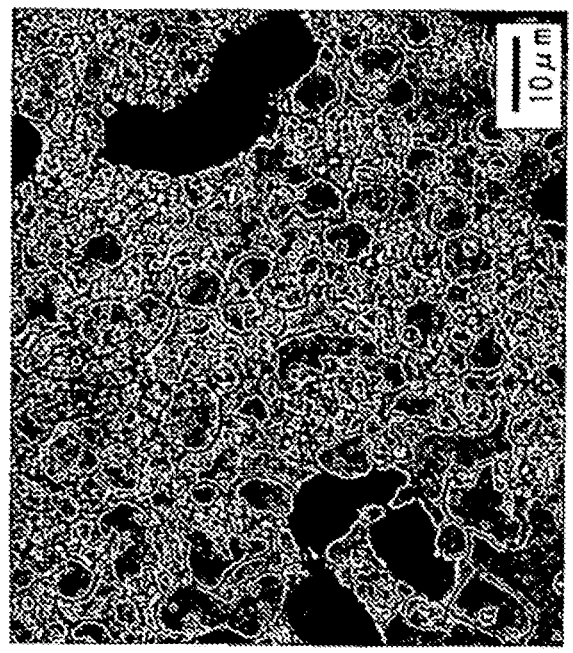
No. 52
FIG. 13

No.38(Fe16Al25Cu-10Cu-9Mo、1200°C)
(Fe-13Al-30Cu-9Mo)

No.39(Fe16Al25Cu-10Cu-4.5Ni-4.5Mo、1200℃)
(Fe-13Al-30Cu-4.5Ni-4.5Mo)

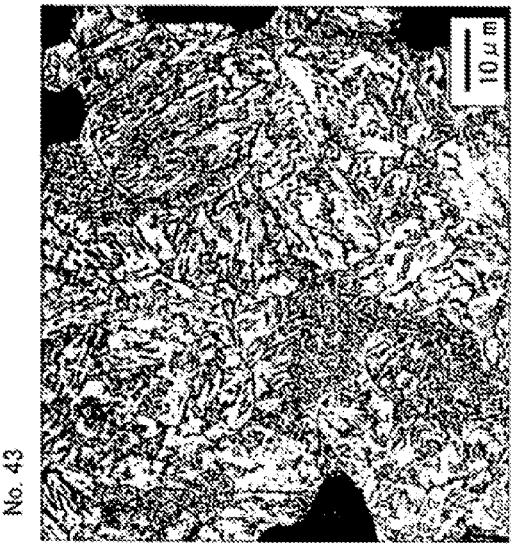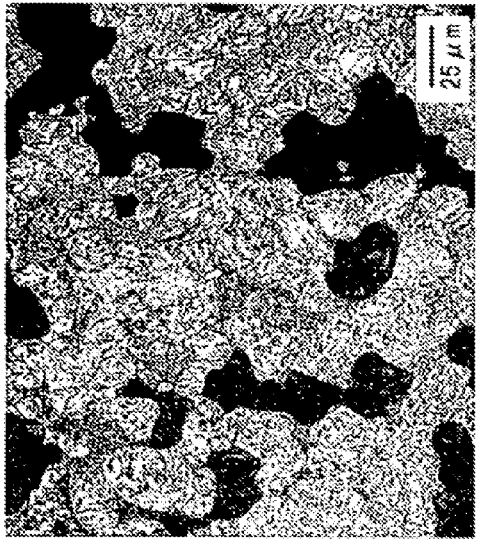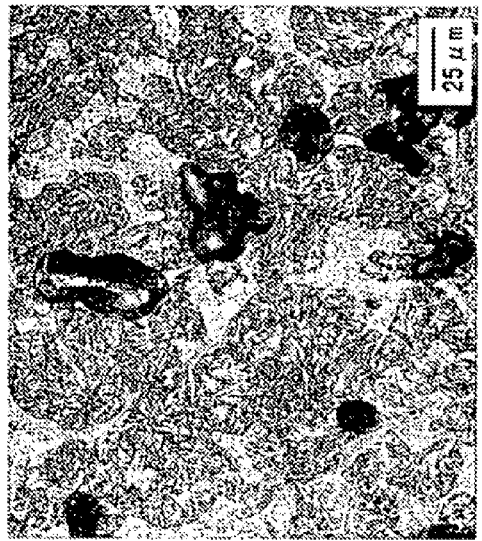
FIG. 16

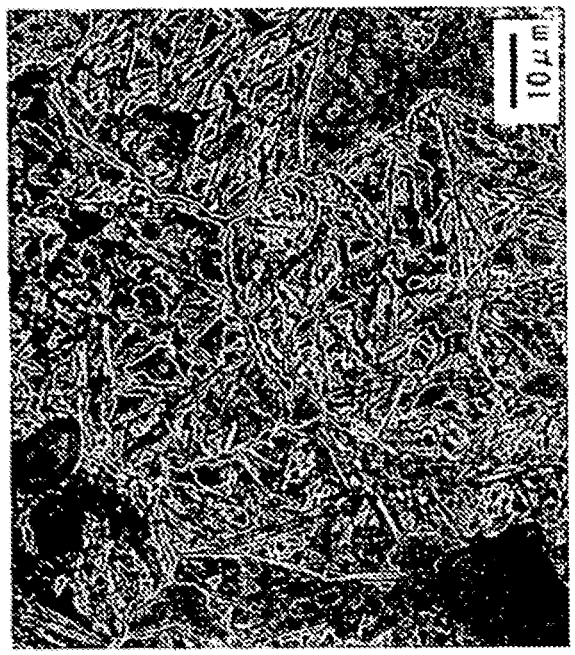
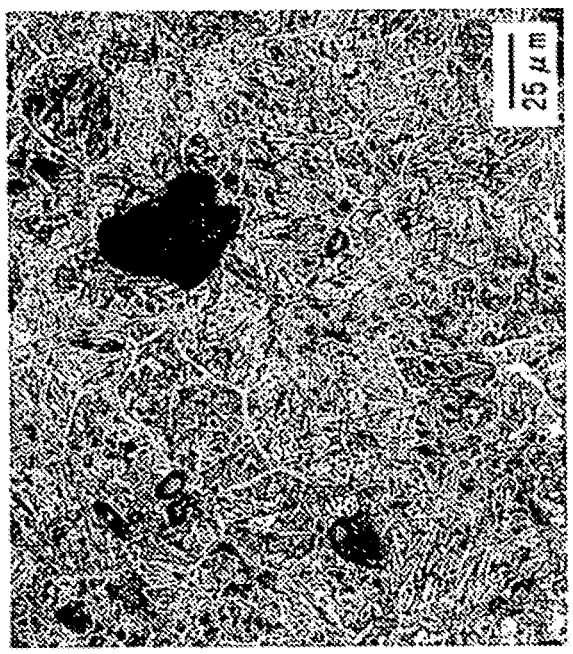
FIG. 17

SINTERED STRUCTURE OF No.48 ALLOY
SINTERED AT 1150°C FOR 1hr

SINTERED STRUCTURE OF No.47 ALLOY
SINTERED AT 1150°C FOR 1hr

SINTERED MATERIAL, FERROUS SINTERED SLIDING MATERIAL, PRODUCING METHOD OF THE SAME, SLIDING MEMBER, PRODUCING METHOD OF THE SAME AND COUPLING DEVICE

This application is a Divisional Application of U.S. application Ser. No. 11/883,330, filed Jul. 30, 2007, now abandoned, which is a national stage application of PCT/JP2006/301710, filed Jan. 26, 2006.

FIELD OF THE INVENTION

The present invention relates to a sintered material, a ferrous sintered sliding material, a producing method of the same, a sliding member, a producing method of the same and a coupling device. Particularly, it relates to a sintered material, a ferrous sintered sliding material, a producing method of the same, a sliding member, a producing method of the same and a coupling device having excellent seizing resistance and abrasion resistance and having a self-lubricating property so as to prolong a lubrication interval or eliminate the necessity of lubricating.

BACKGROUND OF THE INVENTION

As a bearing available with a long lubrication interval or without lubricating, an oil retaining bearing composed of a copper based or ferrous porous sintered alloy retaining lubricating oil in the pores (for example, referring to nonpatent literature 1) and a self-lubricating sliding material in which a solid lubricant such as graphite, $MoS_2$, $WS_2$ and the like is dispersed in a sintered sliding material have been widely used.

As an exemplary self-lubricating copper based sliding material, a material in which a copper based sintered material is disclosed containing a solid lubricant such as graphite, $MoS_2$, $WS_2$ and the like dispersed in the parent phase thereof is hot-pressed (SL alloy, manufactured by Toshiba Tungaloy Co., Ltd.).

And, a ferrous sintered alloy having a structure in which free graphite of 1 to 5% is dispersed in a ferrous base with which carbon of 1.2 wt % or less forms a solid solution has excellent sliding performance. And, a sintered alloy for sliding material in which graphite blended with a raw powder is dispersed as free graphite in the base without dispersing in the base has been known, in which the sintered alloy is produced by subjecting graphite particle to a suitable silver plating so as to form an iron-copper hardened layer 5 to 10 μm in thickness around the free graphite in the ferrous sintered alloy (for example, referring to patent literature 1).

The above sintered alloy for use as a sliding material has good initial sliding performance; however, has a serious problem in which abrasion loss increases remarkably with increase in hour of use. From the viewpoint, in the patent literature 1, a graphite powder blended with a raw powder is subjected to a copper plating so as to have a suitable thickness and a sintering temperature is strictly selected such that the copper plate layer does not disperse in and form a solid solution with ferrous particles so as to form an iron-copper hardened layer around the graphite particle. However, since the thickness of the copper plate layer is constrained and the sintering temperature is restricted to low temperatures so that the copper plate layer will not melt, sufficient sintering strength cannot be obtained. In addition, since a peripheral part of graphite particle is coated with a compact iron-copper hardened layer, inflowing of lubricating oil into the graphite particles is inhibited. For example, lubricating ability of the lubricating oil to be retained cannot be exerted. So, the above ferrous sintered alloy does not have sufficient abrasion resistance.

A high strength self-lubricating sintered sliding material having improved abrasion resistance is known (for example, referring to Patent literature 2). In the self-lubricating sintered sliding material, a mixed powder of a ferrous metal powder having a grain size of 45 μm or less and a solid lubricant granulated to have a grain size of 0.03 to 1 mm, such as graphite and $MoS_2$, in an amount of 10 to 80% by volume is formed and sintered at 1050° C. in order to reduce association of the granulated solid lubricant. And, a copper alloy based infiltrating agent is infiltrated at the sintering in order to reduce concentrating of stress on the granulated solid lubricant.

The above self-lubricating sintered sliding material, however, does not have sufficient sintering strength because the sintering temperature is restricted to 1050° C. in order to prevent a reaction of the granulated graphite with the ferrous base at the sintering. And, a local penetration easily occurs on the ferrous base between the granulated graphite because of long particle spacing of the solid lubricant. And, the infiltration of the copper alloy based infiltrating agent leads to close pores of the sliding material, and, therefore, to inhibit lubricating performance of the retained lubricating oil. As the results, sufficient abrasion resistance and seizing resistance cannot be obtained.

Further, a slipping bearing is known, in which a ferrous sintered alloy layer comprising a mixed powder of copper of 10 to 30 wt %, graphite of 0.1 to 6.5 wt %, molybdenum disulfide of 0.1 to 7.0 wt % and rest of iron is sintering bonded to a steel back metal (for example, referring to Patent literature 3).

The above slipping bearing, however, does not have sufficient sintering strength because of restricted sintering temperatures. The Patent literature 3 shows a method for adding the solid lubricant and an amount of the lubricant mainly, however, little research about a metal phase (ferrous) base excellent in seizing resistance.

One of the oil retaining slipping bearings available for use under high load and having no solid lubricant dispersed therein is produced in such a manner that a compact of mixed powder prepared by blending atomized ferrous powder, copper powder or copper alloy powder, graphite powder, various types of high speed steel powder, ferromolybdenum powder and copper alloy powder (KOBAMEETO, manufactured by CABOT Supermetals K.K.) is sintered at temperatures at which the copper powder or copper alloy powder is melted and then cooled. This cooling process leads to precipitate copper phase or copper alloy phase which is dispersed in and forms a solid solution with the ferrous base. As the results, copper particles or copper alloy particles are dispersed in the iron-carbon alloy base in which martensite exists. And, an abrasion resistant ferrous sintered alloy for oil retaining bearing is known, which contains copper of 7 to 30 wt %, has alloy particle having a specific composition as a harder phase than the iron-carbon alloy base in an amount of 5 to 30 wt % dispersed therein and has porosity of 8 to 30% by volume (for example, referring to Patent literature 4). In the abrasion resistant sintered alloy for oil retaining bearing, a large amount of copper powder or copper alloy powder is blended as raw powder for the following purposes: (1) outflow pores needed for retaining oil are formed by melting copper powder or copper alloy powder at sintering; (2) soft copper particles are dispersed in a martensite phase for improvement in conformability; and (3) the above alloy particle harder than the martensite of the base is dispersed so as to reduce plastic deformation of the base and also reduce load applied on the base at slipping sliding, whereby excellent abrasion resistance can be obtained even under high pressure.

As the alloy particles, there is disclosed: (1) ferrous base alloy particles (high speed steel powder particles) containing C of 0.6 to 1.7 wt %, Cr of 3 to 5 wt %, W of 1 to 20 wt % and V of 0.5 to 6 wt %; (2) ferrous base alloy particles (high speed steel powder particles containing Mo and Co) containing C of 0.6 to 1.7 wt %, Cr of 3 to 5 wt %, W of 1 to 20 wt %, V of 0.5 to 6 wt % and at least one element of Mo and Co of 20 wt % or less; (3) Mo—Fe particles (ferromolybdenum) containing Mo of 55 to 70 wt %; and (4) copper base alloy particles (heat resistant and abrasion resistant alloy particles for a build up spraying, KOBAMEETO manufactured by CABOT Supermetals K.K.) containing Cr of 5 to 15 wt %, Mo of 20 to 40 wt % and Si of 1 to 5 wt % (for example, referring to Patent literature 4).

The above oil retaining slipping bearing, however, does not have sufficient seizing resistance and abrasion resistance under bad lubricating conditions such as a high-bearing stress and low-sliding speed condition because self-lubricating ability by solid lubricant such as graphite, BN, $MoS_2$ is not provided. And, even if the solid lubricant is blended with the raw powder of the oil retaining slipping bearing and then sintered, the solid lubricant is easily reacted with ferrous alloy phase to be dispersed and form a solid solution. As a result, the solid lubricant cannot provide its lubricating ability to the bearing.

Patent literature 1; Japanese Patent Publication No. S58-157951,
Patent literature 2 Japanese Patent Publication No. H4-254556,
Patent literature 3; Japanese Patent No. 3168538,
Patent literature 4; Japanese Patent Publication No. H8-109450,
Nonpatent literature 1; The Association of Powder Process Industry & Engineering, Japan, "Sintered Machine Parts—Design and Production—" GIJUTUSHOIN, 1987 Oct. 20, P. 327-341.

BRIEF SUMMARY OF THE INVENTION

A conventionally used sintered sliding material such as a connecting device used under severe sliding conditions such as a high-bearing stress, slow-speed sliding and oscillating condition has insufficient seizing resistance, abrasion resistance and also self-lubricating ability, whereby it is impossible to prolong a lubrication interval or eliminate the necessity of lubricating.

Accordingly, an object of the present invention is to provide a sintered material, a ferrous sintered sliding material, a producing method of the same, a sliding member, a producing method of the same and a coupling device having excellent seizing resistance and abrasion resistance and providing self-lubricating performance capable of prolonging a lubrication interval or eliminating the necessity of lubricating.

And, in order to solve the aforesaid problems, a sintered sliding material according to the present invention is a No. 3 substance based sintered material containing a No. 1 substance and a No. 2 substance,
wherein said sintered material has:
a sintered structure formed by sintering a mixed powder of a No. 3 substance based powder containing the No. 1 substance in an amount of a solid solubility limit or larger; and another powder comprising the No. 2 substance, and
particle comprising the No. 2 substance dispersed in the sintered material,
in which the No. 2 substance does not react with the No. 1 substance, and
the No. 3 substance, reacts with each of the No. 1 and No. 2 substances.

And, said sintered structure is preferably a liquid-phase sintered structure in which a liquid phase composed of the No. 1 substance mainly is generated and then sintered.

Examples of said No. 1 substance include Cu, Ag and Pb; examples of said No. 2 substance include C, graphite, Mo, W, Pb, $MoS_2$, $WS_2$, BN, Pb and $CaF_2$; and examples of said No. 3 substance include Fe or ferrous alloy containing one or more elements selected from the group consisting of C, Si, Al, Mn, Ni, Cr, Mo, W, V, Ti, Nb and Zr. And, said No. 3 substance based material means a material composed of the No. 3 substance mainly.

A ferrous sintered sliding material according to one embodiment of the present invention is a ferrous sintered sliding material containing copper in an amount of 5 to 50 wt % and C in an amount of 1 to 15 wt %,
wherein said ferrous sintered sliding material has:
a sintered structure formed by sintering a mixed powder of at least one ferrous alloy powder of Fe—Cu based alloy powder containing copper in an amount of a solid solubility limit or larger and 5 wt % to less than 50 wt % and Fe—Cu—C based alloy powder containing copper in an amount of a solid solubility limit or larger and 5 wt % to less than 50 wt % and C in an amount of larger than 0 wt % to 5 wt %, and graphite powder; and
graphite particle dispersed in said sintered sliding material in an amount of 1 wt % to 14 wt % or 3% by volume to 50% by volume.

A ferrous sintered sliding material according to another embodiment of the present invention is a ferrous sintered sliding material containing copper in an amount of 5 to 50 wt % and C in an amount of 1 to 15 wt %,
wherein said ferrous sintered sliding material has:
a sintered structure formed by sintering a mixed powder of at least one ferrous alloy powder of Fe—Cu based alloy powder containing copper in an amount of a solid solubility limit or larger and 5 wt % to less than 50 wt % and Fe—Cu—C based alloy powder containing copper in an amount of a solid solubility limit or larger and 2 wt % to less than 50 wt % and C in an amount of larger than 0 wt % to 5 wt %; graphite powder; and at least one powder of copper powder and copper alloy powder; and
graphite particle dispersed in said sintered sliding material in an amount of 1 wt % to 14 wt % or 3% by volume to 50% by volume.

In the present invention, said sintered structure is preferably a liquid-phase sintered structure in which copper alloy liquid phase composed of copper mainly is generated and then sintered.

And, said graphite particle preferably has an average grain size of 1 μm to 50 μm.

A sliding member according to one embodiment according to the present invention is a sliding member having a back metal and a sintered sliding body fixed to the back metal,
wherein said sintered sliding body is a ferrous sintered sliding body containing copper in an amount of 5 wt % to 50 wt % and C in an amount of 1 w % to 15 wt %, and
said sintered sliding body has:
a sintered structure formed by sintering a mixed powder of at least one ferrous alloy powder of Fe—Cu based alloy powder containing copper in an amount of a solid solubility limit or larger and 5 wt % to less than 50 wt % and Fe—Cu—C based alloy powder containing copper in an amount of a solid solubility limit or larger and 5 wt % to less than 50 wt % and C in an amount of larger than 0 wt % to 5 wt %, and graphite powder, and graphite particle dispersed therein in an amount of 1 wt % to 14 wt % or 3% by volume to 50% by volume and having an average grain size of 1 µm to 50 µm.

A sliding member according to another embodiment of the present invention is a sliding member having a back metal and a sintered sliding body fixed to the back metal, wherein said sintered sliding body is a ferrous sintered sliding body containing copper in an amount of 5 wt % to 50 wt % and C in an amount of 1 wt % to 15 wt %, and said sintered sliding body has:

a sintered structure formed by sintering a mixed powder of at least one ferrous alloy powder of Fe—Cu based alloy powder containing copper in an amount of a solid solubility limit or larger and 5 wt % to less than 50 wt % or Fe—Cu—C based alloy powder containing copper in an amount of a solid solubility limit or larger and 2 wt % to less than 50 wt % and C in an amount of larger than 0 wt % to 5 wt %; graphite powder; and at least one powder of copper powder and copper alloy powder, and graphite particle dispersed therein in an amount of 1 wt % to 14 wt % or 3% by volume to 50% by volume and having an average grain size of 1 µm to 50 µm.

In the present invention, said sintered structure is preferably a liquid-phase sintered structure in which copper alloy liquid phase composed of copper mainly is generated and then sintered.

A coupling device according to the present invention is a coupling device comprising;

one bearing made of the sliding member comprising the back metal and the sintered sliding body according to any one of claims 26 to 28 fixed to the back metal; and another bearing sliding with respect to the former bearing.

A method for producing a ferrous sintered sliding material according to one embodiment of the present invention is a method for producing a ferrous sintered sliding material containing copper in an amount of 5 wt % to 50 wt % and C in an amount of 1 wt % to 15 wt % comprising:

a step for preparing at least one ferrous alloy powder of Fe—Cu based alloy powder containing copper in an amount of a solid solubility limit or larger and 5 wt % to less than 50 wt % and Fe—Cu—C based alloy powder containing copper in an amount of a solid solubility limit or larger and 5 wt % to less than 50 wt % and C in an amount of larger than 0 wt % to 5 wt %, and graphite powder;

a step for mixing the prepared powders;

a step for compacting the mixed powder to form a compact; and a step for sintering the compact.

A method for producing a ferrous sintered sliding material according to another embodiment of the present invention is a method for a producing ferrous sintered sliding material containing copper in an amount of 5 wt % to 50 wt % and C in an amount of 1 wt % to 15 wt % comprising:

a step for preparing at least one ferrous alloy powder of Fe—Cu based alloy powder containing copper in an amount of a solid solubility limit or larger and 5 wt % to less than 50 wt % and Fe—Cu—C based alloy powder containing copper in an amount of a solid solubility limit or larger and 2 wt % to less than 50 wt % and C in an amount of larger than 0 wt % to 5 wt %; graphite powder; and at least one powder of copper powder and copper alloy powder;

a step for mixing the prepared powders;

a step for compacting the mixed powder to form a compact; and a step for sintering the compact.

In the present invention, said sintering step is preferably a liquid-phase sintering step for generating copper alloy liquid phase composed of copper mainly and then sintering.

A method for producing a sliding member according to one embodiment of the present invention is a method for producing a sliding member comprising:

a step for dispersing a mixed powder constituting a sintered sliding body on a back metal and then liquid-phase sintering to bond said sintered sliding body on said back metal; and a step for re-sintering said sintered sliding body by applying mechanical pressure to said sintered sliding body; and wherein said sintered sliding body is a ferrous sintered sliding body containing copper in an amount of 10 wt % to 50 wt % and C in an amount of 1 wt % to 15 wt %, and said sintered sliding body has:

a liquid-phase sintered structure formed by sintering a mixed powder of at least one ferrous alloy powder of Fe—Cu based alloy powder containing copper in an amount of a solid solubility limit or larger and 10 wt % to less than 50 wt % and Fe—Cu—C based alloy powder containing copper in an amount of a solid solubility limit or larger and 10 wt % to less than 50 wt % and C in an amount of larger than 0 wt % to 5 wt %, and graphite powder, and graphite particle dispersed in said sintered sliding body in an amount of 1 wt % to 14 wt % or 3% by volume to 50% by volume and having an average grain size of 1 µm to 50 µm.

A method for producing a sliding member according to another embodiment of the present invention is a method for producing a sliding member comprising:

a step for dispersing a mixed powder constituting a sintered sliding body on a back metal and then liquid-phase sintering to bond said sintered sliding body on said back metal; and a step for re-sintering said sintered sliding body by applying mechanical pressure to said sintered sliding body; and wherein said sintered sliding body is a ferrous sintered sliding body containing copper in an amount of 10 wt % to 50 wt % and C in an amount of 1 wt % to 15 wt %, and said sintered sliding body has:

a liquid-phase sintered structure formed by sintering a mixed powder of at least one ferrous alloy powder of Fe—Cu based alloy powder containing copper in an amount of a solid solubility limit or larger and 5 wt % to less than 50 wt % and Fe—Cu—C based alloy powder containing copper in an amount of a solid solubility limit or larger and 2 wt % to less than 50 wt % and C in an amount of larger than 0 wt % to 5 wt %; graphite powder; and at least one powder of copper powder and copper alloy powder, and graphite particle dispersed in said sintered sliding body in an amount of 1 wt % to 14 wt % or 3% by volume to 50% by volume and having an average grain size of 1 µm to 50 µm.

As described above, according to the present invention, a sintered material, a ferrous sintered sliding material, a producing method of the same, a sliding member, a producing method of the same and a coupling device having excellent seizing resistance and abrasion resistance and providing self-lubricating performance capable of prolonging a lubrication interval or eliminating the necessity of lubricating can be provided.

BRIEF DESCRIPTION OF THE DRAWINGS

FIG. 3A is a cross sectional drawing showing a structure of a bushing and FIG. 3B is a cross sectional drawing showing a structure of a thrust bearing.

FIG. 6 are photographs showing a graphite dispersed structure of each of sintering compacts of No. 6, No. 7, No. 9 and No. 10 alloys, respectively, sintered for one hour at 1200° C.

FIG. 7 are photographs showing a graphite dispersed structure of each of sintering compacts of No. 8 and No. 11 alloys, respectively, sintered for one hour at 1200° C.

FIG. 8 are photographs showing a graphite dispersed structure of sintering compacts of No. 8 alloy sintered for one hour at each temperature of 1200° C. and 1100° C.

FIGS. 12A and 12B are photographs showing a structure of sintered compact of each of No. 18 and No. 19 alloys sintered at 1200° C.

FIG. 13 are photographs showing a structure of sintered compact of each of No. 52 and No. 53 alloys sintered at 1150° C.

FIG. 16 are photographs showing a sintered structure of No. 43 and No. 44 alloys sintered at 1150° C. for one hour.

FIG. 17 is a photograph showing a sintered structure of No. 45 alloy sintered at 1150° C. for one hour.

DETAILED DESCRIPTION OF THE INVENTION

Figure 1:
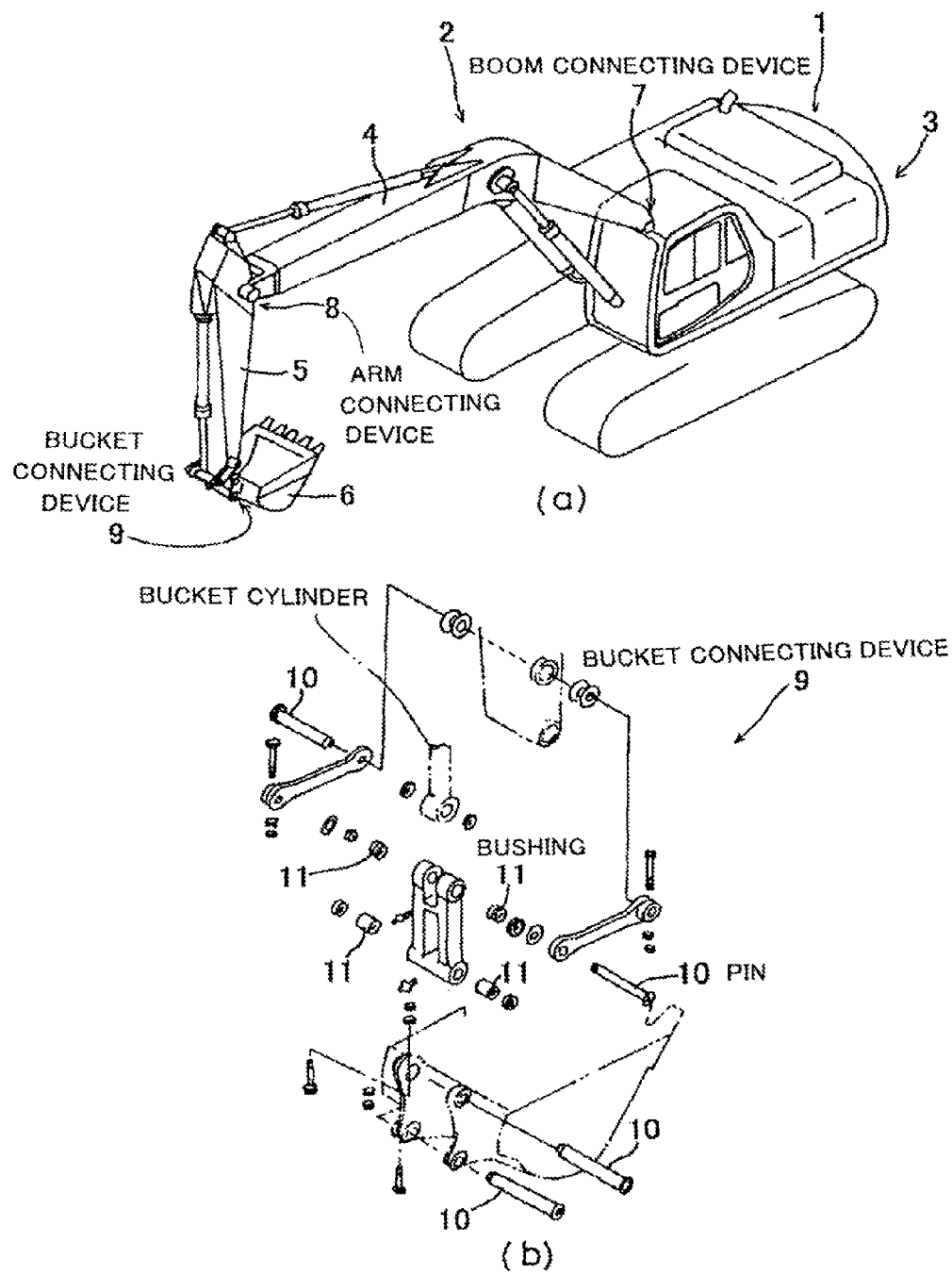
FIG. 1A is a perspective drawing showing a hydraulic shovel according to the embodiment of the present invention and FIG. 1B is an exploded perspective drawing showing a bucket connecting device of the hydraulic shovel.

The present invention relates to a ferrous sintered sliding material (bearing) which is excellent in conformability at sliding, seizing resistance, abrasion resistance and also self-lubricating ability capable of prolonging a lubrication interval or eliminating the necessity of lubricating under severe sliding conditions such as a high-bearing stress, slow-speed sliding and oscillating condition, such as a coupling device equipped for a connecting portion of a construction machine, and a bearing member using the sliding material. More particularly, the sliding material has a base material of a ferrous sintered material comprising ferrous alloy phase (at least one of Fe—Cu based alloy phase or Fe—Cu—C based alloy phase) and copper alloy phase, the ferrous sintered material being produced by using an abrasion resistant and seizing resistant ferrous alloy powder containing copper in an amount of a solid solubility limit or larger at sintering temperatures. And, graphite particle having high self-lubricating performance acted as solid lubricant (graphite with which lubricating oil is easily infiltrated and forms a self-lubricating film excellent in self-lubricating property on a sliding surface) is dispersed in the base material finely with high density. This prevents a local adhesion of the base material. And, sufficient self-lubricating performance makes it possible to prolong a lubrication interval or eliminate the necessity of lubricating. And, since the copper alloy phase is formed into a liquid phase at sintering, the sintered parent phase can have sufficient strength. In addition, lubricating oil can be retained in each of pores of the sintered parent phase obtained by the sintering and the porous graphite dispersed in the sintered parent phase, improving lubricating performance.

Furthermore, the present invention relates to a composite sliding member in which the ferrous sintered sliding material is fixed to a back metal and also an oil retaining slipping bearing (for example, a thrust bush and radial bush) capable of retaining lubricating oil by making at least one of the ferrous sintered sliding material or the back metal into porous.

And, the present invention relates to a Fe—Cu—C based sintered sliding material, used in an oil seal operated under severe sliding conditions, for example in sediment, as typified by a floating seal, in which graphite excellent in conformability and seizing resistance at sliding with keeping air tightness and one or more kinds of cementite, $M_7C_3$ type carbide, $M_6C$ type carbide and MC type carbide, which are effective for improvement in abrasion resistance against sediment and seizing resistance are dispersed in martensite parent phase in a total amount of 5 to 45% by volume (more preferably, 5 to 35% by volume). And, the present invention also relates to a composite sintered sliding material in which the sintered sliding material is fixed to a back metal.

More particularly, in the embodiment of the present invention, as the ferrous alloy powder constituting a ferrous base, Fe—Cu based alloy powder or Fe—Cu—C based alloy powder, which contain copper in an amount of a solid solubility limit or larger, is prepared; as the solid lubricant, graphite powder is prepared, for example. And, the ferrous alloy powder and the graphite powder are mixed, and the mixed powder is formed into a compact and then the compact is sintered at solid-phase sintering temperatures. As the results, the super-saturated copper component contained in the alloy powder is dispersed on a surface of the ferrous alloy powder to disperse the graphite particles finely with high density while preventing the graphite particles from forming a solid solution with the ferrous base. And then, by liquid-sintering the compact at temperatures at which the copper alloy phase contained in the ferrous alloy powder is formed into a liquid phase, the liquefied copper alloy moves to the surface from the inside of the ferrous alloy powder and forms a copper alloy phase on the surface. The copper alloy phase causes the dispersion of the graphite particles finely with high density while preventing the graphite particles from forming a solid solution with the ferrous base. That is, the formation of copper alloy phase, which is not reacted with graphite, on the surface of the ferrous alloy powder can prevent the graphite from dispersing in and forming a solid solution with Fe in the ferrous alloy powder. As the results, it becomes possible to disperse the graphite particles finely with high density in a state in which a solid solution with Fe is not formed. The dispersion of the graphite particles can improve solid lubricating performance.

In addition, the generation of liquefied copper alloy can heighten the sintering strength of ferrous sintered parent phase comprising the ferrous alloy phase and the copper alloy phase.

As described above, the purpose of the present invention is to prevent a reaction (a solid solution dispersion or formation of cementite) of graphite particles with ferrous alloy powder at sintering by enriched copper alloy component existing on the surface of ferrous alloy and liquid phase. Based on this purpose, for example, it becomes possible to use a ferrous alloy powder containing no copper which prevents a reaction with graphite, by plating the ferrous alloy powder with copper or dispersing and alloying copper on a surface of the ferrous alloy powder in an amount of a solid solubility limit or larger. An amount of copper contained in the ferrous alloy powder which is plated with copper or copper alloy or in which copper or copper alloy is dispersing-alloyed or mechanically mixed and alloyed (mechanical alloying) is the same as an amount of copper in the ferrous alloy powder containing copper component in an amount of a solid solubility limit or larger in the present invention. However, it is preferable to use the ferrous alloy powder in which copper is alloyed beforehand at ingot state more than the ferrous alloy powder which is plated with copper or copper alloy or in which copper or copper alloy is dispersing-alloyed or mechanically alloyed, from an economical viewpoint and a point where a reaction with graphite is prevented surely. And, a solid solubility limit of copper in Fe—Cu binary alloy is presumed by the Fe—Cu based phase diagram of HANSEN'S phase diagram book. For example, a solid solubility limit of copper with γ-Fe phase is about 5, 7 and 9 wt % at 1000, 1100 and 1200° C., respectively. This shows that Fe component of about 3 to 5 wt % forms a solid solution with copper alloy equilibrated therewith. And, as mentioned below, copper of high-carbon high-speed steel containing Mo, W and Cr in concentrated amounts has a solid solubility limit of about 2 wt %. Accordingly, in order to improve sintering ability of ferrous sintered sliding material by supersaturated copper, a lower limit of addition amount of copper to be contained in the ferrous sintered sliding material is preferably set to 5 wt %.

And, another type of ferrous alloy powder is also available, which is plated with Mg, Ca, Ag or Pb, which hardly form a solid solution with Fe, or copper alloy containing those elements or in which the elements or the alloy is dispersing-bonded or mechanically alloyed.

A ferrous sintered sliding material according to one embodiment of the present invention is a Fe—Cu—C based sintered sliding material containing copper of 5 wt % to 50 wt % and C of 1 wt % to 15 wt %, in which at least one ferrous alloy powder of Fe—Cu based alloy powder containing copper in an amount of a solid solubility limit or larger and 5 wt % to less than 50 wt % or Fe—Cu—C based alloy powder containing copper in an amount of a solid solubility limit or larger and 5 wt % to less than 50 wt % and C in an amount of larger than 0 wt % to 5 wt % is mixed with graphite powder and the mixed powder is subjected to a sintering such that the sintered compact may have sufficient strength. As a result, the graphite particles aggregated into aggregate having an average grain size of 1 μm to 50 μm are dispersed in the sintered compact in an amount of 1 wt % to 14 wt % or 3% by volume to 50% by volume.

A ferrous sintered sliding material according to another embodiment of the present invention is a Fe—Cu—C based sintered sliding material containing copper of 5 wt % to 50 wt % and C of 1 wt % to 15 wt %, in which at least one ferrous alloy powder of Fe—Cu based alloy powder containing copper in an amount of a solid solubility limit or larger and 5 wt % to less than 50 wt % or Fe—Cu—C based alloy powder containing copper in an amount of a solid solubility limit or larger and 2 wt % to less than 50 wt % and C in an amount of larger than 0 wt % to 5 wt %; graphite powder; and at least one powder of copper powder or copper alloy powder are mixed and the mixed powder is subjected to a sintering such that the sintered compact may have sufficient strength. As the results, the graphite particles aggregated into aggregate having an average grain size of 1 μM to 50 μm are dispersed in the sintered compact in an amount of 1 wt % to 14 wt % or 3% by volume to 50% by volume.

Furthermore, in order to improve the strength of the sintered compact of the ferrous sintered sliding material, a sintered structure of the sintered compact preferably is a liquid-phase sintered structure in which copper alloy liquid phase composed of copper mainly is generated and then sintered. And, in the ferrous sintered sliding material, a lower limit of addition amount of copper is preferably set to 10 wt %, more preferably 15 wt %, in order to increase an amount of copper alloy liquid phase at sintering.

A lower limit of dispersion amount of graphite particles is preferably set to 1 wt % or 3% by volume, where self-lubricating performance of the graphite begins to be exhibited, more preferably 2 wt % or 7% by volume. An upper limit of dispersion amount of graphite particles is preferably 14 wt % or 50% by volume, more preferably 10 wt % or 30% by volume from a viewpoint of strength.

A method for producing the ferrous sintered sliding material comprises a step for preparing at least one ferrous alloy powders of Fe—Cu based alloy powder containing copper in an amount of a solid solubility limit or larger and 5 wt % to less than 50 wt % or Fe—Cu—C based alloy powder containing copper in an amount of a solid solubility limit or larger and 5 wt % to less than 50 wt % and C in an amount of larger than 0 wt % to 5 wt % and graphite powder; a step for mixing the prepared powders into a mixed powder; a step for compacting the mixed powder to form a compact; and a step for sintering the compact.

Another method for producing the ferrous sintered sliding material comprises a step for preparing at least one of Fe—Cu based alloy powder containing copper in an amount of a solid solubility limit or larger and 5 wt % to less than 50 wt % or Fe—Cu—C based alloy powder containing copper in an amount of a solid solubility limit or larger and 2 wt % to less than 50 wt % and C in an amount of larger than 0 wt % to 5 wt %, graphite powder and at least one powder of copper powder or copper alloy powder; a step for mixing the prepared powders into a mixed powder; a step for compacting the mixed powder to form a compact; and a step for sintering the compact.

The sintering is preferably conducted under neutral, reducing or vacuum atmosphere. And, in order to enhance the strength of the ferrous sintered sliding material, the sintering step is preferably a liquid-phase sintering step for generating copper alloy liquid phase composed of copper mainly and then sintering the liquid phase. And, the method preferably comprises further one or more steps among re-pressing, re-sintering and sizing steps after the sintering step in order to strengthen the ferrous sintered sliding material, improve yield and save working steps.

According to each of the methods for producing the ferrous sintered sliding material, since each of Fe—Cu based alloy powder and Fe—Cu—C based alloy powder contains copper in an amount of a solid solubility limit or larger, a copper alloy liquid phase moves to the surface from the inside of the powder at liquid-phase sintering an, therefore, the powder is coated with the copper alloy. And, since the mixed graphite does not react with the copper alloy, it becomes possible to prevent a solid solution formation of the graphite with each of the Fe—Cu based alloy powder and Fe—Cu—C based alloy powder and also precipitation of cementite. So, the mixed graphite particles can be dispersed homogeneously with being aggregated by the liquid phase. Accordingly, a ferrous sintered sliding material excellent in seizing resistance and abrasion resistance and capable of prolonging a lubrication interval or eliminating the necessity of lubricating by self-lubricating property can be produced.

Each of the Fe—Cu based alloy powder and the Fe—Cu—C based alloy powder may contain one or more elements selected from the group of C, Si, Al, Mn, Ni, Cr, Mo, V, W, Co, Sn, Ca, Mg, Ag, Pb, S, P, N, B, Nb, Ti and Zr.

And, the graphite particles preferably have an average grain size of 1 μm to 50 μm smaller than that of the Fe—Cu based alloy powder and the Fe—Cu—C based alloy powder. And, the graphite particle is preferably contained in an amount of 1 wt % to 10 wt % to the mixed powder.

In the methods for producing ferrous sintered sliding material according to the embodiment, one or plural lubricating powders selected from the group consisting of BN powder, Mo powder, W powder, Pb powder or Cu—Pb alloy powder, MnS powder, TiS powder, $CaF_2$ powder, $MoS_2$ powder and $WS_2$ powder may be additionally prepared in the preparing step. In this case, a total amount of the one or plural lubricating powders and the graphite powder is 1 wt % to 14 wt % to the mixed powder.

In a case where a lubricating powder reacted with the copper alloy is mixed, in the preparing step, one or plural lubricating powders (for example, $MoS_2$ powder and $WS_2$ powder) coated with a graphite based material (or carbonaceous material) may be additionally prepared. In this case, a total amount of the lubricating powder coated with the graphite based material and the graphite powder is 1 wt % to 14 wt % to the mixed powder. The reason for coating the surface of each of $MoS_2$ powder and $WS_2$ powder with the graphite based material is to prevent a reaction of Fe—Cu based alloy powder, Fe—Cu—C based alloy powder or copper alloy liquid phase with $MoS_2$ powder or $WS_2$ powder at liquid-phase sintering. If at least one of $MoS_2$ powder or $WS_2$ powder is mixed with graphite powder, the reaction can be prevented without the necessity for coating $MoS_2$ powder and $WS_2$ powder with the graphite based material. And, in a case where a small amount of $MoS_2$ powder and $WS_2$ powder react with the ferrous alloy powder and copper alloy phase, $Cu_2S$ and FeS are formed, whereby the sintered sliding material may be brittle significantly. Accordingly, it is preferable to form one or more compounds of CaS, MnS, CrS, TiS, VS, NbS, ZnS or MgS in the sintered sliding material so as to prevent the formation of CuS and FeS by using ferrous alloy powder containing one or more alloy elements selected from the group consisting of Mn, Cr, Ti, V, Nb and Zr, which have high ability to form sulfide, in a total amount of 1 wt % or more, or mixing principle powder or copper alloy powder so that one or more alloy elements selected from the group consisting of Ca, Mg, Mn, Cr, Ti, V, Nb and Zr are contained in a total amount of 1 wt % or more.

In the preparing step, one or more elements selected from the group consisting of Sn of 0.1 wt % to 5 wt %, Ti of 0.1 wt % to 5 wt %, Si of 0.1 wt % to 3 wt %, P of 0.1 wt % to 1.5 wt %, Mn of 0.1 wt % to 10 wt %, Pb of 10 wt % or less, Ni of 10 wt % or less, Co of 0.1 wt % to 10 wt % and Ag of 10 wt % or less, or master alloy powder containing the elements may be additionally prepared. This can adjust a melting point of Copper alloy phase in the ferrous sintered sliding material and improve sliding property.

In a ferrous sintered sliding material according to the present invention, when fine powder of graphite particle having an average grain size of 6 μm or 1 to 25 μm is blended, most of the fine graphite particles intensively move to a region of copper alloy liquid phase generated at sintering, and are firmly aggregated by sintering contractile force of metal phase and dispersed. So, as a blending quantity of graphite powder or an amount of copper alloy liquid phase increases and as a size of ferrous alloy phase particle increases, the graphite particles aggregate into a large size. For example, graphite particles dispersed at liquid-phase sintering at 1200° C. prevent coarsening of ferrous alloy particle and form graphite particle aggregate having an average diameter of about 50 μm or less. Accordingly, it is preferable to form the ferrous alloy powder into a fine grain size. In a case where fine graphite particle having an average grain size of 30 μm or less is dispersed in order to improve strength and self-lubricating ability, it becomes possible to make a grain size of the aggregated graphite particle smaller by making Fe—Cu based alloy powder and Fe—Cu—C based alloy powder into a small size of #200 mesh or less (75 μm or less). And, by making Fe—Cu based alloy powder and Fe—Cu—C based alloy powder into a small size of #300 mesh or less (55 μm or less) or an average grain size of 20 μm or less, it becomes possible to improve strength and to make an average grain size of the dispersed graphite particle smaller.

And, an adjustment of a liquid-phase sintering temperature to 1100° C. makes a size of the ferrous alloy particle smaller and suppresses an increase in the amount of liquid phase. As the results, it becomes possible to make a size of aggregated graphite particle smaller than that of a liquid-phase sintering temperature of 1200° C. And, an addition of Sn, Ti, Si, Mn, P, Ni, Co and the like to the mixed powder makes it possible to lower a melting point of copper alloy phase and also to improve strength of copper alloy phase and sliding property. In view of copper alloy diagram described in HANSEN'S phase diagram book, an addition amount of Sn is preferably 5 wt % or less, an addition amount of Ti is preferably 5 wt % or less, an addition amount of Si is preferably 3 wt % or less, an addition amount Mn is preferably 10 wt % or less, an addition amount of P is preferably 1.5 wt % or less, an addition amount of Pb is preferably 10 wt % or less, an addition amount of Ni is preferably 10 wt % or less, an addition amount of Co is preferably 10 wt % or less and an addition amount of Ag is preferably 10 wt % or less. And, a lower limit of addition amount of each element is not limited; however, is preferably 0.1 wt % where the above improving effects appears.

And, a sintering (solid-phase sintering) at temperatures at which a copper alloy liquid phase is not generated further suppresses aggregation of the graphite particles to be mixed whereby the graphite particles can be dispersed extremely finely like a dispersion state of graphite particle. This phenomenon is preferable from a viewpoint of improvement in seizing resistance; however, an addition amount of graphite is preferably adjusted to a range within 1 to 8 wt % from viewpoint of improvement in strength of sintered material. And, it is also preferable to adjust a grain size of ferrous alloy powder or copper based powder to be used to #200 mesh (75 μm) or less, more preferably #300 mesh (45 μm).

As described above, a reaction of graphite with ferrous alloy phase is suppressed by copper alloy phase infiltrated from ferrous alloy powder and graphite particle is transferred and aggregated to a region of liquid phase of copper alloy phase, and dispersed. Accordingly, it is also preferable to add solid lubricant, such as BN, Mo, W, MnS, TiS and $CaF_2$, which hardly reacts with copper alloy. An addition amount of the solid lubricant is preferably adjusted so that the solid lubricant and graphite particles will be dispersed in a sintered sliding material in a total amount of 1 wt % to 14 wt %. And, it is also possible to add solid lubricant, for example at least one of $MoS_2$ powder and $WS_2$, which react with copper alloy, with suppressing a reaction with copper alloy by mixing the solid lubricant with graphite particle. Furthermore, it is also possible to add at least one of $MoS_2$ powder or $WS_2$ powder coated with graphite based material or carbon. By coating the powder with graphite based material, a reaction with copper alloy can be suppressed. An addition amount of the solid lubricant is preferably adjusted so that the solid lubricant and graphite particles will be dispersed in a sintered sliding material in a total amount of 1 wt % to 14 wt %.

In order to disperse graphite particle having an average grain size of 1 μm to 50 μm in a sintered sliding material, fine graphite powder having an average grain size of 1 μm to 50 μm (preferably 1 μm to 25 μm) is employed. Referring to a relation between fatigue strength of cast iron and a grain size of precipitated and dispersed graphite, an average grain size of graphite particle dispersed in a sintered sliding material is preferably adjusted to 30 μm or less.

From a viewpoint of preventing failure in supply of lubricating oil caused by blocking of oil retaining pores due to plastic deformation of a sliding layer of sliding surface, in addition to the purpose for preventing degradation of strength of sintered compact, it is preferable to disperse one or more coarse particles having an average grain size of 0.05 mm to 1 mm selected from the group consisting of graphite particles, BN particles, $MoS_2$ particles and $WS_2$ particles, in a sintered sliding material in a total amount of 1 wt % to 13 wt % (preferably 1 wt % to 10 wt %). In such a case, if a large amount of coarse particle powder is blended at a forming step of mixed powder, the coarse particle deforms into a flat shape and, therefore, a strength of sintered compact may be reduced significantly. Accordingly, an addition amount of coarse particle is preferably adjusted to small as 0 to 10 wt %. Referring to porosity of oil retaining sintered material, an addition amount of coarse particle is more preferably 1 to 5 wt %.

A dispersion of solid lubricant particle in the ferrous sintered sliding material improves seizing resistance of the sliding material remarkably. And, an improvement in seizing resistance of metal phase itself of ferrous alloy phase or copper alloy phase constituting a ferrous sintered sliding material further improves seizing resistance of a while of ferrous sintered sliding material. And, an adjustment of suitable addition amount of solid lubricant can provide a higher strength sintered sliding material.

Consequently, by precipitating and dispersing fine graphite in ferrous alloy phase of a Fe—Cu—C based alloy powder, a local seizing can be prevented.

The Fe—Cu—C based alloy powder which forms a ferrous alloy phase containing fine graphite precipitated and dispersed therein preferably contains at least one elements of C of 1 wt % to 5 wt %, and at least one of Si of 0.5 wt % to 7 wt % or Ni of 0.5 wt % to 7 wt %, which promotes graphitization. From a viewpoint of promoting graphitization and cost, a total content of Si and Ni is preferably 2 wt % to 7 wt % and a content of Ni is larger than 0 wt % to 4 wt %.

Note that a ferrous alloy phase containing Al of 5 to 30 wt % improves seizing resistance and abrasion resistance, a main constituent of ferrous alloy phase of ferrous sintered sliding material preferably comprises Fe—Cu—Al—C based ferrous alloy phase particle containing at least copper of 10 wt % to 50 wt %, Al of 3 wt % to 20 wt % and C of larger than 0 wt % to 1.2 wt %. And, the Fe—Cu—Al—C based ferrous alloy phase particle may contain one or more elements selected from the group consisting of Si, Mn, Ni, Mo, V, W, Cr, Co, S, P, N, B, Nb, Ti and Zr.

And, From a viewpoint of improvement in abrasion resistance and seizing resistance, referring to compositions of bearing steel, cold-working tool steel, hot-working tool steel and high speed steel, a main constituent of ferrous alloy powder used for a ferrous sintered sliding material is preferably a ferrous alloy phase particle which contains copper in an amount of a solid solubility limit or larger at sintering temperature or 2 wt % to 50 wt %, C in an amount of 0.25 wt % to 3.5 wt % and at least one or more elements selected from the group consisting of Cr in an amount of 1 wt % to 25 wt %, Mo in an amount of larger than 0 wt % to 15 wt %, W in an amount of larger than 0 wt % to 21 wt % and V in an amount of larger than 0 wt % to 7 wt % and has a structure in which one or more compounds selected from the group consisting of cementite, $M_7C_3$ type carbide, $M_6C$ type carbide, $M_2C$ type carbide and MC type carbide are precipitated and dispersed finely. A lower limit of addition amount of each of Mo, W and V is preferably 1 wt %, 1 wt % and 0.1 wt %, respectively, in view of hardenability and abrasion resistance of ferrous alloy phase in the ferrous sintered sliding material; however, is more preferably 3 wt %, 3 wt % and 0.5 wt %, respectively, in view of seizing resistance. In a high speed steel SHK9 (corresponded to M2 of AISI standard), a solid solubility of copper at 1100° C. is 1.5 wt %.

Referring to an amount of carbide of bearing steel, cold-working tool steel, hot-working tool steel and high speed steel, an amount of carbide dispersed in the ferrous sintered sliding material is preferably adjusted to 5 to 50% by volume. The reason for setting an upper limit of amount of carbide to 50% by volume is because of remarkable degradation of deflection strength if it exceeds 50% by volume. A preferable upper limit of amount of carbide is 35% by volume; however, in a case where a counterpart sliding material is a carburized and quenched material or induction hardened material, is more preferably 25% by volume in view of attack ability against the counterpart sliding material.

In the ferrous sintered sliding material according to the present invention, it is possible to use two or more alloy powders selected from the group consisting of the following powders (1) to (5); (1) Fe—Cu based alloy powder containing copper in an amount of a solid solubility limit or larger and 5 wt % to less than 50 wt %; (2) Fe—Cu—C based powder containing copper in an amount of a solid solubility limit or larger and 2 wt % to less than 50 wt % and C in an amount of larger than 0 wt % to 5 wt %; (3) Fe—Cu—C based alloy powder containing C in an amount of 1 wt % to 5 wt % and at least one of Si in an mount of 0.5 wt % to 7 wt % or Ni in an amount of 0.5 wt % to 7 wt % and having graphite precipitated and dispersed therein; (4) at least one of Fe—Cu based alloy powder or Fe—Cu—C based alloy powder, which contain Al in an amount of 3 wt % to 20 wt %; and (5) Fe—Cu—C based alloy powder containing C in an amount of 0.25 wt % to 3.5 wt % and one or more elements selected from the group consisting of Cr in an amount of 1 wt % to 25 wt %, Mo in an amount of larger than 0 wt % (or 1 wt % or larger) to 15 wt %, W in an amount of larger than 0 wt % (or 1 wt % or larger) to 21 wt % and V in an amount of larger than 0 wt % (or 0.1 wt % or larger) to 7 wt % and having one or more carbides selected from the group consisting of $M_7C_3$ type carbide, $M_6C$ type carbide, $M_2C$ type carbide and MC type carbide precipitated and dispersed therein.

A fine dispersion of cementite, $M_7C_3$ type carbide, $M_6C$ type carbide, $M_2C$ type carbide and MC type carbide, which are harder than metal phase, in metal phase can improve seizing resistance and abrasion resistance remarkably. Accordingly, it is preferable to disperse one or more carbides selected from the group consisting of $M_7C_3$ type carbide, $M_6C$ type carbide, $M_2C$ type carbide and MC type carbide in at least one phase of ferrous alloy phase or copper alloy phase of ferrous sintered sliding material in an amount of 0.5% by volume to 30% by volume (preferably 0.5% by volume to 25% by volume). And, in view of attack ability applied to a counterpart sliding material by hard particle having Vickers hardness Hv100 or more, an average grain size of the carbide to be dispersed is preferably adjusted to 5 µm or less. And, a carbide to be dispersed is preferably composed of $M_6C$ type carbide mainly because $M_6C$ type carbide is dispersed in high speed steel excellent in seizing resistance and abrasion resistance.

When abrasion resistance of the ferrous sintered sliding material is important factor, Fe—Cu—C based alloy base (Fe—Cu—C based alloy phase) in the ferrous sintered sliding material preferably has at least one structures of hard martensite structure or bainite structure. On the contrary, when conformability of the ferrous sintered sliding material is important factor, the Fe—Cu—C based alloy base (Fe—Cu—C based alloy phase) preferably has at least one or more structures selected from the group consisting of soft pearlite structure, structure in which carbide particles are finely dispersed in ferrite phase (high temperature tempering structures of sorbite and martensite) and ferrite structure.

So, a ferrous sintered sliding material according to the present invention may have one or more structures selected from the group consisting of ferrite structure, martensite structure, bainite structure, sorbite structure and pearlite structure. Theses structures are preferably adjusted suitably accordance with an application condition.

When used for a floating seal, seizing resistance decreases if a large amount of retained austenite exists in martensite phase. So, in a ferrous sintered sliding material according to the present invention, an amount of retained austenite in martensite phase is preferably adjusted to 40% by volume or less.

A structure of the ferrous sintered sliding material is controlled by adjusting an amount of carbon in ferrous alloy powder to a range within 0 wt % to 5 wt % and a cooling rate after sintering, and also subjecting to another heat treatment. In order to control the structure, it is necessary to adjust hardenability and structure of ferrous alloy base and further machinability, sintering ability and precipitation ability of graphite. Accordingly, the ferrous alloy powder preferably contains one or more elements selected from the group consisting of C, Si, Al, Mn, Ni, Cr, Mo, V, W, Co, Sn, Ca, Mg, Ag, Pb, S, P, N, B, Nb, Ti and Zr. This can adjust quench hardenability, sliding ability, machinability and sintering ability of ferrous sintered sliding material. A total amount of the elements is preferably set to 1 wt % or more.

When a counterpart sliding surface is a quenched material or induction hardened material, like a bushing of coupling device of construction machine, an amount of the carbide is adjusted to a range under 25% by volume from a viewpoint of attack ability against the counterpart sliding material, as described above. However, when it is applied to a thrust bearing and floating seal used under hard sediment abrasion environment, an amount of the carbide is preferably adjusted to a wide range within 10% by volume to 50% by volume.

In a ferrous alloy powder in which a large amount of the above carbide is precipitated and dispersed, a saturated solid solubility of copper is about 1.5 wt %. Considering that copper alloy phase in the ferrous alloy powder is made into a liquid phase at sintering and the copper alloy phase in a liquid phase state coats around a surface of particle of the ferrous alloy powder, a lower limit of content of copper in the ferrous alloy powder is preferably 5 wt %. On the contrary, when a content of copper in the ferrous alloy powder is excessive, an amount of soft copper alloy phase becomes excessive, causing degradation of abrasion resistance. So, an upper limit of content of copper in ferrous alloy powder is preferably 50 wt %. And, an adjustment of a content of copper in ferrous alloy powder to 2 wt % to 40 wt % and use of a mixed powder blended with copper powder or copper alloy powder of 5 to 45 wt % can improve formability and sintering bonding ability with a back metal.

And, carbon of 0.2 wt % to 0.8 wt % preferably forms a solid solution with martensite phase in ferrous alloy phase of the ferrous sintered sliding material. This improves heat crack resistance. And, it is preferable to adjust a carbon concentration in the martensite phase to 0.15 to 0.5 wt % from a viewpoint of improvement in heat crack resistance. And, it is also preferable to use high speed steel type ferrous alloy powder in which at least one of $M_6C$ type carbide or MC type carbide (containing WC type carbide) excellent in seizing resistance and abrasion resistance is dispersed. A carbon concentration of the martensite phase is adjusted according to a carbon concentration and an alloy element concentration of ferrous alloy powder to be used, sintering temperature and quenching temperature. And, it is main features to disperse graphite contained in the mixed powder in the sintered sliding material as lubricating particles.

In the sintered sliding material, carbon of 0.2 wt % to 1.2 wt % may form a solid solution with ferrous alloy phase, and a part or while of the ferrous alloy phase may be formed into a pearlite structure. This can improve heat crack resistance.

The martensite phase of the sintered sliding material has Vickers Hardness Hv450 or more, and an amount of retained austenite in the martensite phase is preferably adjusted to 40% by volume (more preferably 35% by volume or less). This improves seizing resistance.

In Fe—Cu—Al—C based ferrous alloy phase of the Fe—Cu—C based alloy powder, in order to enhance heat crack resistance and abrasion resistance remarkably, a lower limit of Al content is preferably 10 wt % thereby to stabilize ferrite phase mainly. And, the Fe—Cu—Al—C based ferrous alloy phase preferably contains one or more elements of Ni of 3 wt % to 20 wt %, Mn of 3 wt % to 20 wt % or Co of 3 wt % to 20 wt % so as to provide age hardening property and adjust hardness of the ferrite phase to Vickers hardness Hv 450 or more.

In order to improve seizing resistance and abrasion resistance of copper alloy phase in the ferrous sintered sliding material, it is preferable to add alloy element such as Sn, Ti, Al, Si, Mn and Ni and to disperse fine carbide, as described above. In addition, the copper alloy phase preferably contains Al of 5 wt % to 20 wt % and has Cu—Al based β-phase or γ-phase compound.

And, the ferrous sintered sliding material preferably has sintered pores or porous graphite having solid lubricating performance. In such case, a total content of the sintered pores and porous graphite is set to 5% by volume to 50% by volume in order to obtain air permeability. In addition, it is also possible to fill the sintered pores and porous graphite with lubricating oil or lubricating composition comprising lubricating oil and wax in order to exhibit lubricating performance similar to an oil retaining bearing.

In the ferrous sintered sliding material having graphite dispersed therein to have self-lubricating performance, a large amount of porous graphite is preferably contained in order to develop pumping action of the lubricating oil.

Accordingly, it is preferable to use synthetic lubricating oil which generates little sludge and the like so that the pumping action would not prevented. In a case where the sintered pores or porous graphite is filled with the lubricating composition, an addition amount of wax is preferably adjusted such that a dropping point (melting point measured according to a dropping method) of the lubricating composition is 60° C. or less.

A sliding member according to the present invention is one that a sintered sliding body comprising the above ferrous sintered sliding material is fixed to a back metal.

The sliding member has a back metal and a sintered sliding body fixed to the back metal. The sintered sliding body is a ferrous sintered sliding body containing copper in an amount of 5 wt % to 50 wt % and C in an amount of 1 wt % to 15 wt %, and has a sintered structure and graphite particle having an average grain size of 1 µm to 50 µm. The sintered structure is formed by sintering a mixed powder of at least one ferrous alloy powder of Fe—Cu based alloy powder containing copper in an amount of a solid solubility limit or larger and 5 wt % to less than 50 wt % or Fe—Cu—C based alloy powder containing copper in an amount of a solid solubility limit or larger and 5 wt % to less than 50 wt % and C in an amount of larger than 0 wt % to 5 wt %, and graphite powder. The graphite particles are dispersed in the sintered sliding body in an amount of 1 wt % to 14 wt % or 3% by volume to 50% by volume.

Another type of the sliding member has a back metal and a sintered sliding body fixed to the back metal. The sintered sliding body comprises a ferrous sintered sliding body containing copper in an amount of 5 wt % to 50 wt % and C in an amount of 1 wt % to 15 wt % and has a sintered structure and graphite particle having an average grain size of 1 µm to 50 µm. The sintered structure is formed by sintering a mixed powder of at least one ferrous alloy powder of Fe—Cu based alloy powder containing copper in an amount of a solid solubility limit or larger and 5 wt % to less than 50 wt % or Fe—Cu—C based alloy powder containing copper in an amount of a solid solubility limit or larger and 2 wt % to less than 50 wt % and C in an amount of larger than 0 wt % to 5 wt %; graphite powder; and at least one powder of copper powder or copper alloy powder. The graphite powder is dispersed in the sintered sliding body in an amount of 1 wt % to 14 wt % or 3% by volume to 50% by volume.

From a viewpoint of further improvement in sintering strength of the ferrous sintered sliding material, the sintered structure preferably has a liquid-phase sintered structure in which copper alloy liquid phase composed of copper mainly is generated at sintering and then sintered. And, a lower limit of addition amount of copper added to the ferrous sintered sliding material is preferably set to 10 wt %, more preferably 15 wt %, so as to increase an amount of copper alloy liquid phase at sintering.

The sintered sliding body may be fixed to the back metal by any method among sintering bonding, sintering infiltrating bonding, brazing, caulking, fitting, pressing, adhesion, fastening using bolt and clinching. When the sintered sliding body is fixed to the back metal by sintering bonding, a content of copper in the sintered sliding body is preferably set to 10 wt %, more preferably 15 wt %. And, as a material for the back metal, any one of steel, cast iron and ferrous sintered material is preferred. When a ferrous sintered sliding material is used, the ferrous sintered sliding material and the sintered sliding body is formed into a two-layer structure and then sintering bonded to form a sliding member, preferably.

And, it is preferable to form recess such as bore and groove on a sliding surface of the sintered sliding body and fill it with any of lubricating composition comprising lubricating oil and wax, lubricating resin, solid lubricant and lubricating composition of solid lubricant and wax. This can elongate a lubrication interval and also save used amount of sintered sliding material thereby to reduce cost.

A method for producing a sliding member according to the present invention comprises a step for bonding the sintered sliding body to the back metal by dispersing a mixed powder constituting the sintered sliding body on the back metal and then liquid-phase sintering; and a step for re-sintering by applying mechanical press to the sintered sliding body.

The sintered sliding body is a ferrous sintered sliding body containing copper in an amount of 10 wt % to 50 wt % and C in amount of 1 wt % to 15 wt %. The sintered sliding body comprises a liquid-phase sintered structure formed by liquid-phase sintering a mixed powder of at least one ferrous alloy powder of Fe—Cu based alloy powder containing copper in an amount of a solid solubility limit or larger and 5 wt % to less than 50 wt % or Fe—Cu—C based alloy powder containing copper in an amount of a solid solubility limit or larger and 10 wt % to less than 50 wt % and C in an amount of larger than 0 wt % to 5 wt % and graphite powder; and graphite particle dispersed in the sintered sliding body in an amount of 1 wt % to 14 wt % or 3% by volume to 50% by volume and having an average grain size of 1 µm to 50 µm.

Another type of the sintered sliding body is a ferrous sintered sliding body containing copper in an amount of 10 wt % to 50 wt % and C in an amount of 1 wt % to 15 wt %. The sintered sliding body comprises a liquid-phase sintered structure formed by liquid-phase sintering a mixed powder of at least one ferrous alloy powder of Fe—Cu based alloy powder containing copper in an amount of a solid solubility limit or larger and 5 wt % to less than 50 wt % or Fe—Cu—C based alloy powder containing copper in an amount of a solid solubility limit or larger and 2 wt % to less than 50 wt % and C in an amount of larger than 0 wt % to 5 wt %; graphite powder; and at least one of copper powder or copper alloy powder, and graphite particle dispersed in the sintered sliding body in an amount of 1 wt % to 14 wt % or 3% by volume to 50% by volume and having an average grain size of 1 µm to 50 µm.

When the sintered sliding body is sintering bonded to the back metal, a content of copper in the sintered sliding body is preferably 15 wt %, more preferably 20 wt % so as to increase an amount of liquid phase of copper alloy at sintering bonding.

A coupling device according to the present invention is provided with a bearing comprising the above sliding member and another bearing which slides with respect to the former bearing.

The coupling device is preferably used as a coupling means equipped for a constructing machine, roller assembly, track link in crawler type base carrier, roller device in crawler type base carrier, equalizer which supports a bulldozer body, suspension device of dump track, floating seal, valve guide and valve seat.

Next, embodiments of coupling device according to the present invention will be described.

Figure 2:
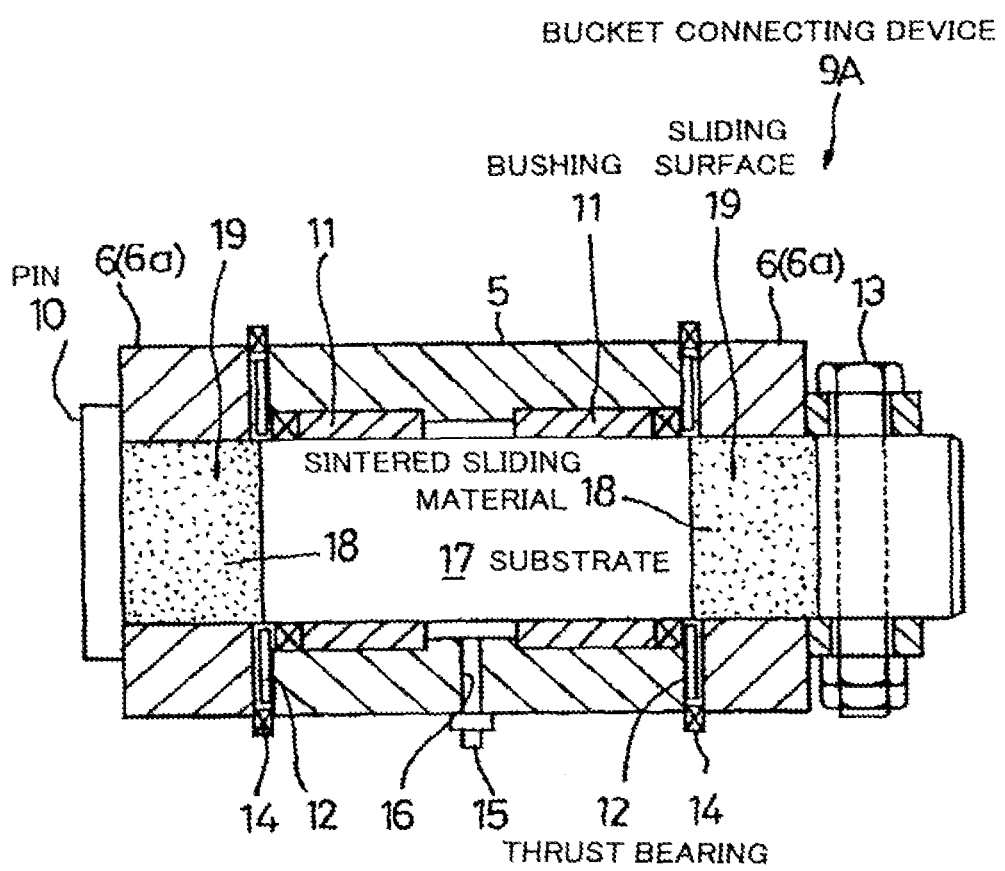
FIG. 2 is a cross sectional drawing schematically showing a structure of the bucket connecting device according to the first embodiment of the present invention.

FIG. 1A is a perspective drawing showing a hydraulic shovel according to the embodiment of the present invention and FIG. 1B is an exploded perspective drawing showing a bucket connecting device of the hydraulic shovel. FIG. 2 is a cross sectional drawing schematically showing a structure of the bucket connecting device according to the first embodiment of the present invention. FIG. 3A is a cross sectional drawing showing a structure of a bushing and FIG. 3B is a cross sectional drawing showing a structure of a thrust bearing.

As shown in FIG. 1A, an operating portion 2 of a hydraulic shovel 1, according to this embodiment, is provided with an upper turning body 3 to which a boom 4 is connected by a boom connecting device 7. The boom 4 is connected to an arm 5 by an arm connecting device 8, and the arm 5 is connected to a bucket 6 by a bucket connecting device 9. These connecting devices 7, 8 and 9 have the same fundamental structure. For example, the bucket connecting device 9, as shown in FIG. 1B, is provided with a connecting pin 10 and a bushing 11 mainly. Hereinafter, the bucket connecting device 9A arranged at a connecting portion of the arm 5 and the bucket 6 will be described in detail with reference to FIG. 2.

As shown in FIG. 2, the bucket connecting device 9A is provided with two thrust bearings 12 which connect the bucket (one component) 6 to an arm (the other component) 5 in a rotatable manner and receive a thrust load applied between the bucket 6 and the arm 5. Here, the arm 5 is arranged via a connecting pin (a support shaft) 10 supported by brackets 6a formed on the buckets 6 and bushings (bearing bushings) 11 fitted onto the connecting pin 10. The busing 11 is forced into a distal end of the arm 5. The connecting pin 10 is fixed to the bracket 6a by a bolt 13. A seal member 14 and a lubricating oil supply port 15, a lubricating oil supply passage 16 are shown in the figure.

The connecting pin 10 is provided with a steel substrate (a back metal) 17 having axis function and sliding surfaces 19 made of a sintered sliding material 18, according to the present invention, fixed to the substrate 17. The sliding surfaces 19 are formed at positions at which the connecting pin 10 is supported to the brackets 6a.

The bushing 11, as shown in FIG. 3A, is provided with a cylindrical substrate (a back metal (a bushing back metal)) 20 and a sliding surface 22 made of a sintered sliding material 21, according to the present invention, fixed to an inner surface of the substrate 20. The substrate (the back metal) 20 is preferably made of a porous ferrous sintered material.

And, the thrust bearing 12, as shown in FIG. 3B, is provided with a cylindrical hollow substrate (a back metal) 23 and a sliding surface 25 made of a sintered sliding material 24, according to the present invention, fixed to a surface of the substrate 23. The thrust bearing 12 has a sliding bearing performance for receiving a thrust load applied to the arm 5 from the bucket (a rotating body) 6 with slidable contact.

FIGS. 4A to 4d' are drawings showing another structures of the bushing according to the embodiment of the present invention. In the FIG. 4A to 4D', the same part as the bushing 11 of the first embodiment are represented by the same number as the first embodiment.

Figure 4:
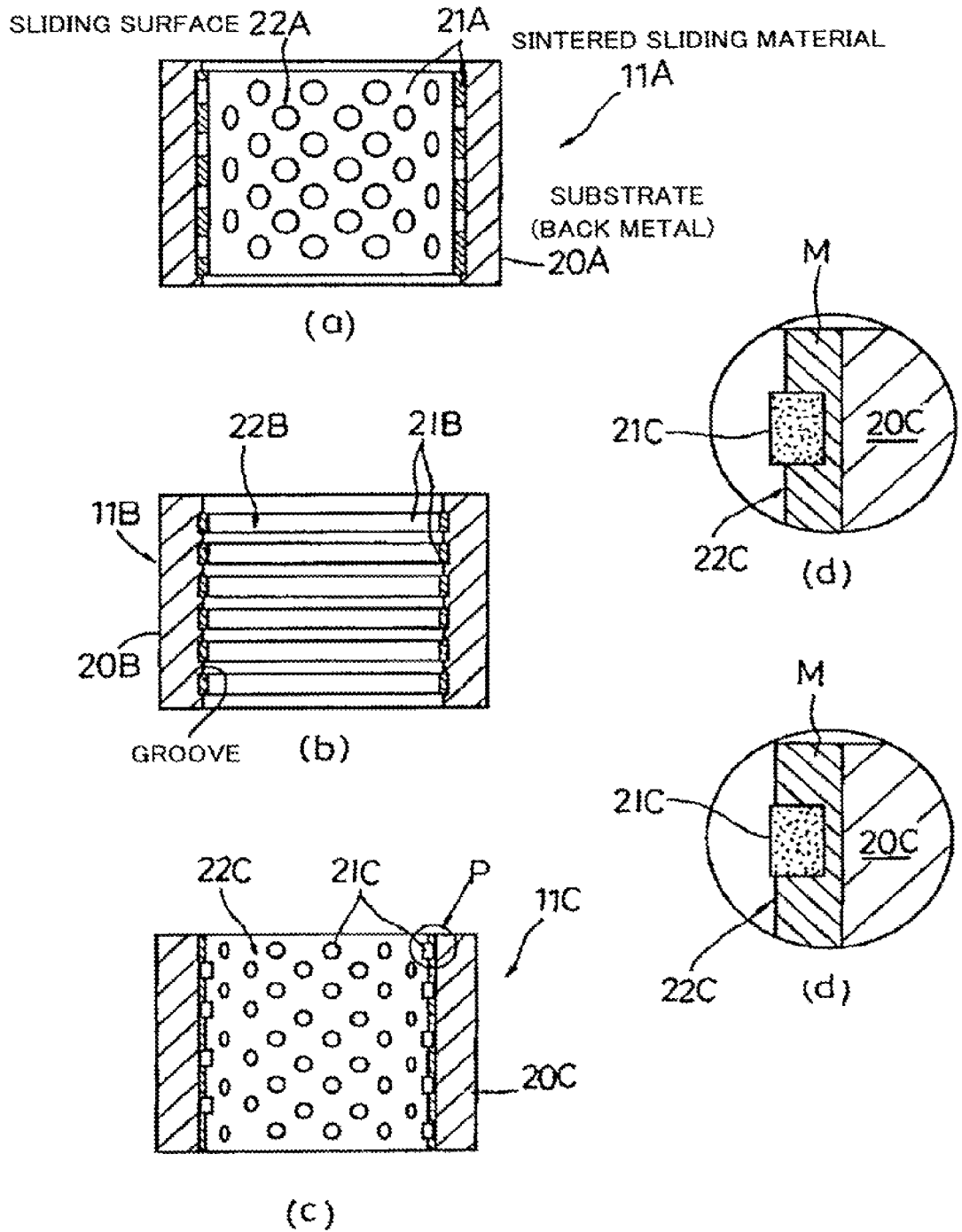
FIGS. 4A to 4d' are drawings showing another structures of the bushing according to the embodiment of the present invention.

A method for increasing an amount of oil or lubricating compound retained in the bushing by an inexpensive way, except for a method in which the substrate (back metal) 20 is made of a porous ferrous sintered sliding material like the bushing 11 according to the first embodiment, includes a method for fixing a sintered sliding material to a steel back metal so as to form recesses, such as holes and grooves, on a sliding surface thereof so that a lubricating compound can be retained therein (shown in FIGS. 4A and 4B), and a method for dispersing small pieces made of a sintered sliding material in a porous copper based sintered material and fixing the porous copper based sintered material to a steel back metal (shown in FIG. 4C). In a case of the later method, a bushing 22c is preferably produced in such a manner that small pieces made of a sintered sliding material 21C are dispersed in a porous copper based sintered material M while keeping from directly bonding with a back metal 20C (shown in FIG. 4D and FIG. 4D' showing a P-part of the FIG. 4C) and then the porous copper based sintered material M is sintering-bonded to the back metal 20c so as to form a double sintered material. Then, the double sintered material is subjected to a curling bushing producing method in which the double sintered material is roundly bended with the sintered layer being inside. Such the method enables producing the bushing inexpensively. A double layered connecting pin, in which a curling bushing made by the same curling bushing producing method, except that the double sintered material is roundly bended with the sintered layer being outside, is fixed to a connecting pin by the aforesaid combining method, can be used as with the connecting pin 10.

A bushing 11A, shown in FIG. 4A, is made such that a punched plate made of a sintered sliding material 21A, like a punching metal, is roundly bended and then the bended plate is forced into an inner bore of a steel back metal 20A while butting or clinching so as to be fitted into a groove formed on an inner surface of the steel back metal 20A.

A bushing 11B, shown in FIG. 4B, is made such that a plurality of ring-shaped sintered sliding materials 21B are butted and fitted into a plurality of grooves formed on an inner surface of a steel back metal 20B. And, in the bushings 11A and 11B, a lubricating compound, such as grease, is retained in recesses, such as holes and grooves, formed on the sliding surface so that the sliding surface can be well lubricated with the lubricating compound.

And, a bushing 11C, shown in FIG. 4C, is made in a manner described below. After a copper based sintered powder is dispersed on a steel plate which becomes a steel back metal 20C at finishing and then sintering-bonded thereto, small pieces made of a sintered sliding material 21C and a copper based sintered powder are dispersed and re-sintered thereto (M in the figure; the copper based sintered material), and then the steel is rolled so as to produce a double layered sintered member. Alternatively, after a copper based sintered powder are dispersed on a steel plate which becomes a steel back metal 20C at finishing and sintering-bonded thereto, small pieces made of a sintered sliding material 21C or a Mo—Cu alloy compact, according to the present invention, are sintering-bonded thereto. And, a raw powder of a porous bronze based sintered layer M is dispersed on the steel plate, and then the steel plate is rolled and sintered so as to produce a double layered sliding member. Then, each of the double layered sliding members is roundly bended so as to produce the bushing. In the such produced bushing 11C, since the copper based sliding material M surrounding the small pieces is made of the porous sliding material having a high oil-retaining capacity, a lubricating interval can be further prolonged. And, in such a case, an area ratio of the dispersed small pieces to a sliding surface of the bushing 11C is preferably 10 to 70%.

EXAMPLE

Next, an example of ferrous sintered sliding material according to the present invention will be described with reference to the drawings.

Example 1

Preliminary Test

Figure 5:
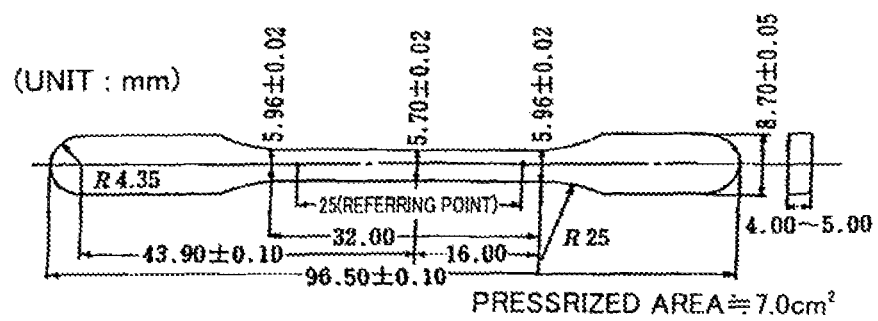
FIG. 5 is a drawing showing a test piece of compacted powder for a tensile test.

In this test, using various types of high speed steel powder (M2) having composition of Fe-16 wt % Al-25 wt % Cu, Fe-50 wt % Al, Fe-16 wt % Al under #200 mesh and Fe-0.9 wt % C-5 wt % Mo-6 wt % W-1 wt % V having an average grain size of 16 µm; iron powder under #300 mesh (ASC300, manufactured by Höganäs); electrolytic copper powder (CE15, manufactured by FUKUDA METAL FOIL POWDER Co., Ltd.); graphite powder having an average grain size of 6 µm (KS6, manufactured by LONZA Group Ltd,); Sn powder under #250 mesh; TiH powder under #300 mesh; Fe-25 wt % P powder; Mo powder having an average grain size of 5 μm; Ni powder under #350 mesh; and Mn powder, various types of alloy shown in Tables 1 and 2 were prepared. Each of the alloys was formed into a test piece, shown in FIG. 5, at forming pressure of 5 ton/cm² and then vacuum sintered for 1 hour at each temperature within 1000 to 1200° C. And, after cooling under $N_2$ gas of 600 torr, each sintered compact was examined in sintering ability of the alloy by a rate of change in size of the sintered compact and reactivity of graphite added to the sintered compact with ferrous alloy phase by observing the structure. In Tables 1 and 2, blending quantity of each powder is shown by wt %, and the rate of change in size of the sintered compact at each sintering temperature is expressed in percentage showing a rate of change in length of the test piece after sintering to that before sintering, which are shown in the right side of the blending quantity. When the test piece is contracted, the rate is shown in minus sign.

TABLE 1

| No. | Fe16Al25Cu | Fe16Al | Fe50Al | ASC300 | Cu(CE25) | M2FP | SUS440C3 |
|---|---|---|---|---|---|---|---|
| No. 1 | 100 | | | | | | |
| No. 2 | 100 | | | | 5 | | |
| No. 3 | 100 | | | | 10 | | |
| No. 4 | 85 | | | | 15 | | |
| No. 5 | 85 | | | | 15 | | |
| No. 6 | 85 | | | | 15 | | |
| No. 7 | 85 | | | | 15 | | |
| No. 8 | 85 | | | | 15 | | |
| No. 9 | 85 | | | | 15 | | |
| No. 10 | 85 | | | | 15 | | |
| No. 11 | 85 | | | | 15 | | |
| No. 12 | 85 | | | | 15 | | |
| No. 13 | | 100 | | | 0 | | |
| No. 14 | | 75 | | | 25 | | |
| No. 15 | | 62.5 | | Bal. | 25 | | |
| No. 16 | | | | Bal. | 30 | | |
| No. 17 | | | | Bal. | 30 | | |
| No. 18 | | | | Bal. | 30 | | |
| No. 19 | | | | Bal. | 30 | | |
| No. 20 | 31.25 | | | Bal. | 22.2 | | |
| No. 21 | 62.5 | | | Bal. | 14.4 | | |
| No. 22 | 75 | | | Bal. | 11.5 | | |
| No. 23 | 31.25 | | | Bal. | 22.2 | | |
| No. 24 | 62.5 | | | Bal. | 14.4 | | |
| No. 25 | 75 | | | Bal. | 11.5 | | |
| No. 26 | | | Bal. | | 15 | | |
| No. 27 | | | Bal. | | 15 | | |
| No. 28 | | | Bal. | | 15 | | |
| No. 29 | | | Bal. | | 15 | | |
| No. 30 | | | Bal. | | 15 | | |
| No. 31 | | | Bal. | | 15 | | |
| No. 32 | | | Bal. | | 15 | | |
| No. 33 | | | Bal. | | 15 | | |
| No. 34 | | | Bal. | | 15 | | |

| No. | Gr(KS6) | OTHERS | 1200° C. | 1150° C. | 1100° C. | 1050° C. | 1000° C. |
|---|---|---|---|---|---|---|---|
| No. 1 | | | −11.9 | | −4.12 | | −1.6 |
| No. 2 | | | −11.9 | | −8.11 | | −2.4 |
| No. 3 | | | −10.79 | | −10.7 | | −3.09 |
| No. 4 | | | −9.35 | −10.9 | −11.47 | −6.73 | −2.91 |
| No. 5 | 1.2 | | −7.87 | | −6.72 | | −2.87 |
| No. 6 | 2 | | −5.39 | | −5.69 | −3.64 | −2.59 |
| No. 7 | 3 | | −3.37 | | −3.51 | −2.74 | −2.16 |
| No. 8 | 4 | | −1.69 | | −1.94 | −2.04 | −1.86 |
| No. 9 | 5 | | −0.53 | | −0.96 | −1.51 | −1.41 |
| No. 10 | 6 | | 0.26 | | −0.32 | −1.05 | −1 |
| No. 11 | 7 | | 0.55 | | 0.02 | −0.67 | −0.65 |
| No. 12 | 9 | | 0.84 | | 0.51 | −0.17 | −0.15 |
| No. 13 | | | −0.46 | | −0.36 | | −0.21 |
| No. 14 | | | −7.36 | | −4.74 | | 1.37 |
| No. 15 | 1.2 | | −6.07 | | −3.05 | | 1.32 |
| No. 16 | | | −1.72 | | −0.01 | | −0.27 |
| No. 17 | | 2Sn | −0.75 | | 0.11 | | 0.26 |
| No. 18 | 0.6 | | −2.21 | | −1.47 | | −0.78 |
| No. 19 | 1.2 | | −3.26 | | −2.18 | | −0.96 |
| No. 20 | 0.6 | | −4.24 | | −3.04 | | 1.22 |
| No. 21 | 0.6 | | −7.22 | | −7.42 | | −0.15 |
| No. 22 | 0.6 | | −7.92 | | −8.59 | | −1.18 |
| No. 23 | 1.2 | | −4.27 | | −2.69 | | 1.52 |
| No. 24 | 1.2 | | −6.76 | | −6.18 | | −0.22 |
| No. 25 | 1.2 | | −7.03 | | −7.14 | | −1.26 |
| No. 26 | | 2Ni | −9.29 | | −11.04 | | −2.17 |
| No. 27 | | 5Ni | −9.83 | | −9.58 | | −1.46 |
| No. 28 | 2 | 5Ni | −5.08 | | −3.27 | −1.59 | −0.63 |

TABLE 1-continued

| | | | | | |
|---|---|---|---|---|---|
| No. 29 | | 10Ni | −8.08 | −10.67 | −5.71 | −0.62 |
| No. 30 | | 15Ni | −7.64 | −9.6 | −3.43 | 0.57 |
| No. 31 | | 20Ni | −8.6 | −6.17 | −1.59 | 0.97 |
| No. 32 | 3 | 10Ni | −0.21 | −0.59 | 1.49 | 2.15 |
| No. 33 | 3 | 15Ni | 0.78 | 0.63 | 3.39 | 3.57 |
| No. 34 | 3 | 20Ni | 1.61 | 2.48 | 4.09 | 4.05 |

TABLE 2

| No. | Fe16Al25Cu | Fe16Al | Fe50Al | ASC300 | Cu(CE25) | M2FP | SUS440C3 |
|---|---|---|---|---|---|---|---|
| No. 35 | Bal. | | | | 15 | | |
| No. 36 | Bal. | | | | 15 | | |
| No. 37 | Bal | | | | 15 | | |
| No. 38 | 90 | | | | 10 | | |
| No. 39 | 90 | | | | 10 | | |
| No. 40 | 97 | | | | 10 | | |
| No. 41 | 97 | | | | 10 | | |
| No. 42 | 97 | | | | 10 | | |
| No. 43 | | | | Bal. | 25 | 15 | |
| No. 44 | | | | Bal. | 25 | 15 | |
| No. 45 | | | | Bal. | 25 | 15 | |
| No. 46 | Bal. | | | | 15 | 15 | |
| No. 47 | Bal. | | | | 15 | 15 | |
| No. 48 | Bal. | | | | 20 | 30 | |
| No. 49 | Bal. | | | | 20 | 60 | |
| No. 50 | 0 | | | | 25 | Bal. | |
| No. 51 | 0 | | | | 25 | Bal. | |
| No. 52 | 0 | | | | 25 | Bal. | |
| No. 53 | 0 | | | | 25 | Bal. | |
| No. 54 | 0 | | | | 25 | Bal. | |
| No. 55 | 0 | | | | 25 | Bal. | |
| No. 56 | 0 | | | | 25 | Bal. | |
| No. 57 | 0 | | | | 25 | Bal. | |
| No. 58 | 0 | | | | 25 | Bal. | |
| No. 59 | 0 | | | | 25 | Bal. | |
| No. 60 | 0 | | 10 | | 25 | Bal. | |
| No. 61 | | | | Bal. | 25 | | 15 |
| No. 62 | | | | Bal. | 25 | | 15 |
| No. 63 | | | | Bal. | 25 | | 15 |
| No. 64 | Bal. | | | | 15 | | 15 |
| No. 65 | Bal. | | | | 15 | | 15 |
| No. 66 | Bal. | | | | 20 | | 30 |
| No. 67 | Bal. | | | | 20 | | 60 |

| No. | Gr(KS6) | OTHERS | 1200° C. | 1150° C. | 1100° C. | 1050° C. | 1000° C. |
|---|---|---|---|---|---|---|---|
| No. 35 | | 2Mo | −9.04 | | −10.9 | | −2.24 |
| No. 36 | | 5Mo | −8.38 | | −10.3 | | −2.43 |
| No. 37 | 2 | 5Mo | −5.8 | | −6.13 | −3.74 | −2.53 |
| No. 38 | | 10Mo | −9.3 | | −11 | | −3.16 |
| No. 39 | | 5Ni, 5Mo | −10.9 | | −9.32 | | −3.06 |
| No. 40 | | 3TiH | −8.21 | | −8.72 | | −2.26 |
| No. 41 | | 3Mn | −8.43 | | −10.5 | | −2.7 |
| No. 42 | | 3Sn | −7.27 | | −9.58 | | −6.63 |
| No. 43 | 0 | | −0.35 | 0.44 | 1.11 | | |
| No. 44 | 0.6 | | −2.12 | −1.63 | −0.99 | | |
| No. 45 | 1.2 | | −5.28 | −3.09 | −2.11 | | |
| No. 46 | | | −7.54 | −8.38 | −9.67 | −5.19 | |
| No. 47 | 1.2 | | −6.34 | −6.9 | −8.88 | −4.64 | |
| No. 48 | | | −7.13 | −7.85 | −8.59 | −6.87 | |
| No. 49 | | | −7.46 | −4.79 | −2.58 | 0.64 | |
| No. 50 | | | −7.74 | −5.25 | −3.43 | −0.2 | |
| No. 51 | | 2Fe25P | −14.3 | −14.1 | −10.6 | −2.65 | |
| No. 52 | | 3Sn | −9.22 | −6.45 | −4.3 | −1.99 | |
| No. 53 | 1.2 | 3Sn | Melt | −18.3 | −13.4 | −7.35 | |
| No. 54 | 1.2 | 2TiH | −14.7 | −14 | −6.86 | −1.49 | |
| No. 55 | | 5Mo | −6.42 | −4.17 | −2.04 | −0.19 | |
| No. 56 | | 3Sn, 5Mo | −7.74 | −5 | −2.84 | −1.09 | |
| No. 57 | | 2Si | −8.29 | −5.27 | −3.69 | −0.47 | |
| No. 58 | 1.2 | 2Si | Melt | −18.2 | −11.9 | −2.86 | |
| No. 59 | | 10Mn, 2FeP | −13 | −14.2 | −13.4 | −6.71 | |
| No. 60 | | 2FeP | −9.32 | −8.64 | −6.86 | −1.04 | |
| No. 61 | 0 | | | | | | |
| No. 62 | 0.6 | | | | | | |
| No. 63 | 1.2 | | | | | | |

TABLE 2-continued

| | | | | | |
|---|---|---|---|---|---|
| No. 64 | | | −7.62 | −8.24 | −9.76 | −4.28 |
| No. 65 | 1.2 | | −6.82 | −7.64 | −9.27 | −4.82 |
| No. 66 | | | −6.83 | −7.79 | −9.2 | −5.81 |
| No. 67 | | | | | | |

As a typically ferrous alloy powder containing copper in an amount of a solid solubility limit or larger, Fe-16 wt % Al-25 wt % Cu was used. In order to facilitate the observational evaluation of the reactivity of the added graphite with the alloy at sintering, a sintering test was carried out by using mainly Fe-16 wt % Al-25 wt % Cu alloy powder, which forms α-Fe phase at the sintering temperature range.

By comparing No. 1 alloy with each of No. 13 alloy and No. 14 alloy, in Table 1, it is found that Fe-16 wt % Al-25 wt % Cu alloy powder which contains copper in an amount of a solid solubility limit or larger has good sintering ability. That is, copper contained in an amount of a solid solubility limit or larger improves the sintering ability even at solid-phase sintering at 1000° C., and Cu—Al—Fe alloy liquid phase generated by sintering at 1100° C. or more remarkably improves the sintering ability. And, an addition of copper alloy, like No. 2 alloy to No. 4 alloy, improves the sintering ability more remarkably. Furthermore, an addition of the copper powder and copper alloy powder improves press forming performance. Temperatures at which liquid phase of each Fe-16 wt % Al-25 wt % Cu alloy powder and copper powder is generated are about 1060° C. and 1083° C., respectively.

No. 5 alloy to No. 12 alloy, in Table 1, were alloys that fine graphite of about 9 wt % was added to No. 4 alloy, which show that an addition of fine graphite of about 7 wt % or less causes contraction in size of the sintered compact by sintering whereby sufficient sintering ability was ensured. And, it is also found that, in ferrous sintered material to which graphite is added in an amount larger than that of conventionally Fe-2 wt % graphite, an eutectic reaction of graphite with ferrous powder causes dissolution at temperatures of 1150° C. or higher; however, in the present alloy containing copper in an amount of a solid solubility limit or larger, a sintering at 1200° C. or higher does not cause dissolution and the mixed graphite does not react with the ferrous alloy powder.

FIG. 6 are photographs showing a graphite dispersed structure of each of sintering compacts of No. 6, No. 7, No. 9 and No. 10 alloys, respectively, sintered for one hour at 1200° C. FIG. 7 are photographs showing a graphite dispersed structure of each of sintering compacts of No. 8 and No. 11 alloys, respectively, sintered for one hour at 1200° C. These photographs shows that fine graphite powder having an average grain size of 6 μm does not react with α-Fe—Al—Cu phase and is dispersed in the Cu—Al—Fe alloy liquid phase uniformly while being aggregated in an aggregate having a diameter of several μm to 25 μm.

Figure 9:
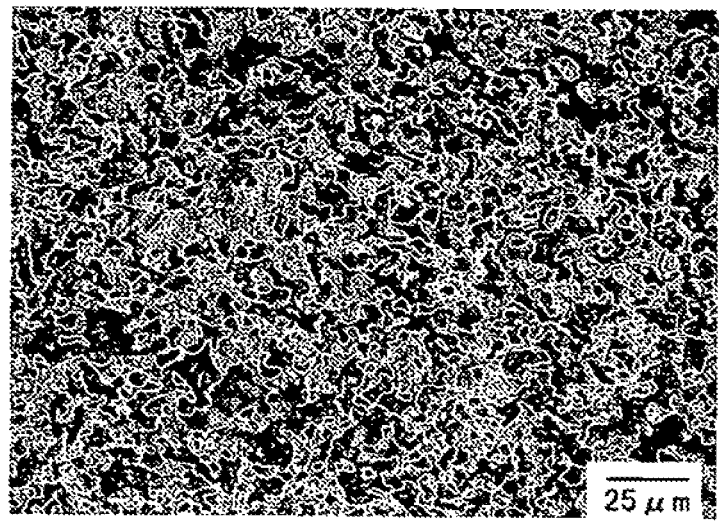
FIG. 9 is a photograph showing a graphite dispersed structure of sintering compacts of No. 8 alloy sintered for one hour at 1000° C.

FIG. 8 are photographs showing a graphite dispersed structure of sintering compacts of No. 8 alloy sintered for one hour at each temperature of 1200° C. and 1100° C. FIG. 9 is a photograph showing a graphite dispersed structure of sintering compacts of No. 8 alloy sintered for one hour at 1000° C. FIGS. 8 and 9 shows that the graphite aggregate dispersed in the structure become finer uniformly as a sintering temperature is low. This is because the graphite aggregate becomes reduced in size as the Cu—Al—Fe alloy liquid phase (α-Fe—Al—Cu phase) becomes reduced in size, and the aggregation is suppressed owing to solid-phase sintering.

Figure 10:
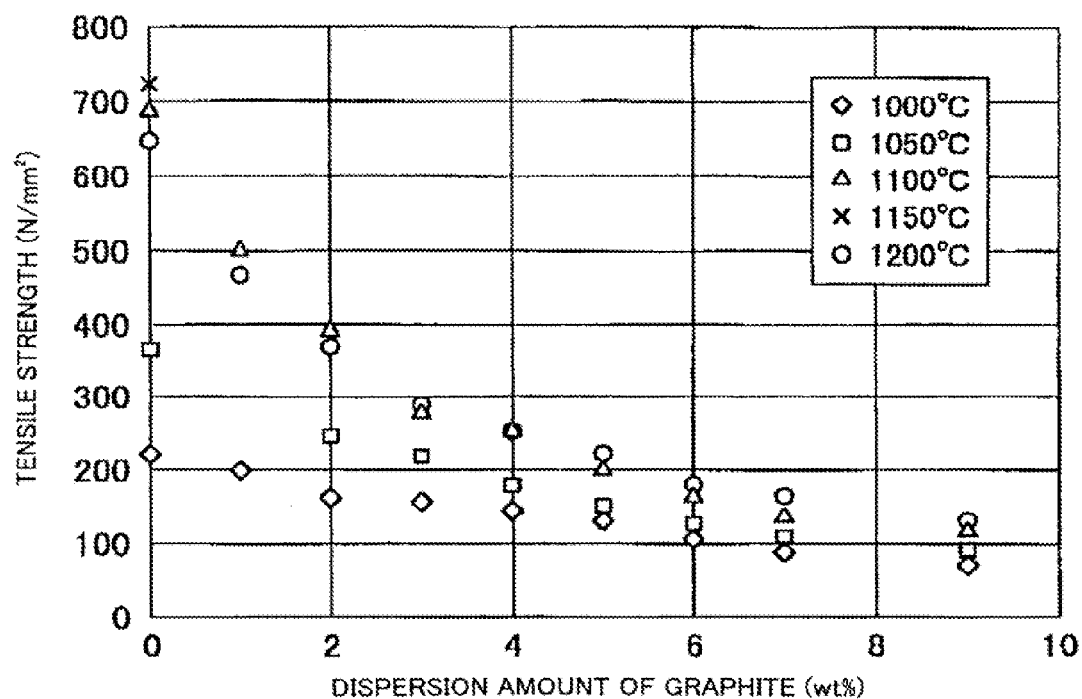
FIG. 10 is a graph showing a relation between a dispersion amount of graphite at each sintering temperature of No. 4 to No. 12 alloys and tensile strength.

FIG. 10 is a graph showing a relation between a dispersion amount of graphite at each sintering temperature of No. 4 to No. 12 alloys and tensile strength. The tensile strength was obtained by results of a tensile test of the test pieces. The photographs shows that sintering temperatures higher than 1050° C. at which the Fe-16 wt % Al-25 wt % Cu alloy powder begins to be formed into a liquid phase, more preferably a melting point of copper (1083° C.), improves strength dramatically; however, solid-phase sintering temperatures lower than 1050° C. also provides sufficient strength for use in a sintered sliding material. For example, referring to a conventional oil retaining bearing having radial crushing strength of 20 kg/m$^2$ or more (tensile strength of about 100N/mm$^2$ or more), it is found that a liquid-phase sintered sliding material may contain graphite in an amount of up to 9 wt % and a solid-phase sintered sliding material may contain graphite in an amount of up to 7 wt %. When used under high pressure higher than 500 kg/mm$^2$, it is preferable to have tensile strength of 150N/mm$^2$ or more, equivalent to three times of the surface pressure. So, an upper limit of addition amount of graphite is preferably set to 7 wt %, and a sintered sliding material having a liquid-phase sintered structure is more preferable.

The α-Fe—Al—Cu phase has Vickers hardness Hv330 to 350 obtained by measurement using a micro Vickers hardness tester. So, it is found that even α-ferrous phase is adjusted so as to have suitable hardness excellent in abrasion resistance.

Figure 11:
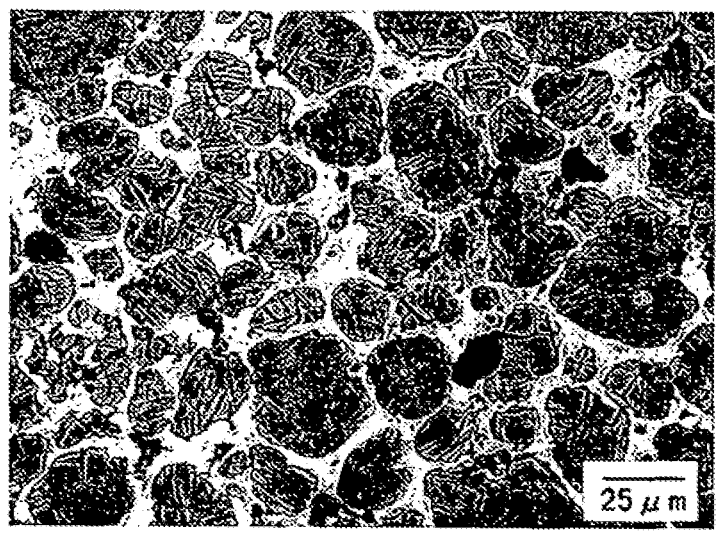
FIG. 11 is a photograph showing a structure of No. 15 alloy sintered at 1200° C.

By using No. 15, No. 18, No. 19, No. 52 and No. 53 alloys in Tables 1 and 2, reactivity of added graphite at sintering was evaluated. FIG. 11 is a photograph showing a structure of No. 15 alloy sintered at 1200° C. The photograph shows that, in a liquid-phase sintered compact of a mixed powder of Fe-50 wt % Al which does not contain copper in an amount of a solid solubility limit or larger; ferrous alloy powder (ASC300); copper powder and graphite powder, the added graphite is dispersed in and forms a solid solution with Fe—Al—Cu phase, regardless of formation of liquid phase of added copper powder, and forms an austenite phase (γ-phase) and white cementite carbide at its grain boundary, and is transformed into a martensite phase having Vickers hardness Hv550 or more by cooling using N$_2$ gas from the sintering temperature.

FIGS. 12A and 12B are photographs showing a structure of sintered compact of each of No. 18 and No. 19 alloys sintered at 1200° C. These photographs shows that the added graphite is dispersed in and forms a solid solution with Fe—Cu phase, and is formed in a pearlite structure having Vickers hardness Hv 380 to 430 by cooling using N$_2$ gas from the sintering temperature. And, it further shows that an addition of graphite of about 1 wt % forms coarse cementite (white phase) at boundary face between grain boundary of Fe—Cu—C phase particle and copper alloy phase.

FIG. 13 are photographs showing a structure of sintered compact of each of No. 52 and No. 53 alloys sintered at 1150° C. On comparing No. 52 with No. 53, it is found that almost of fine specific carbide precipitated in high speed steel (M2) particle disappears by addition of graphite of 1.2 wt % and coarse carbide (white phase) is formed at the grain boundary. When a sintered compact which precipitates such coarse carbide or carbide connected to grain boundary is applied to a sliding material, attack ability against the counterpart sliding material becomes large, resulting in remarkable deteriorating of seizing resistance and strength. Accordingly, it is preferable to use high speed steel powder containing copper in an amount of a solid solubility limit or larger so as to prevent formation of coarse carbide and also to disperse graphite.

In any cases of FIGS. 11 to 13, the added graphite reacts with Fe phase and acts to form coarse carbide. As compared these cases with cases of FIGS. 6 to 9, it is found that, in Fe—Cu based alloy containing copper in an amount of a solid solubility limit or larger, a liquid phase having a copper alloy composition generated in inside of particle at sintering covers the surface of the particle of the powder resulting in preventing the added graphite from dispersing in and forming a solid solution with the ferrous alloy phase.

The graphite dispersion mechanism is applied to not only the Fe—Al—Cu alloy used in the present invention but also a wide range of ferrous alloy containing Cu in an amount of a solid solubility limit or larger. As exemplary ferrous alloy, there are given: (1) Fe—Cu—C based powder from economical viewpoint; (2) Fe—Cu—Si—C based powder (cast iron) in which graphite is dispersed in powder particle; (3) Fe—Cu—Al based and Fe—Cu—Al—C based powders excellent in seizing resistance; and (4) Fe—Cu—Cr—Mo—C based powder in which copper is contained in bearing steel, cold-working tool steel, hot-working tool steel and high speed steel excellent in seizing resistance. By dispersing graphite in a sintered material using such powder, it is possible to produce a sliding material and member having self-lubricating performance and capable of operating for a long period without lubricating.

In the ferrous sintered sliding material according to the present invention, the Fe—Cu based powder preferably contains carbon in an amount required for transformation of a ferrous alloy phase in the ferrous sintered sliding material into a martensite structure previously. In high alloy Fe—Cu—Cr—Mo based powder containing specific carbide, such as $M_6C$ type carbide, WC type carbide and $Cr_7C_3$ type carbide which are contained in high speed steel excellent in seizing resistance, dispersed therein finely and cast iron based powder containing graphite previously dispersed therein, it is preferable to contain a large amount of carbon component previously.

And, adjusting a copper alloy phase in Fe—Cu based sintered material into a copper alloy composition phase, such as bronze and Al bronze excellent in seizing resistance, leads to improvement in sliding performance of the above ferrous sintered sliding material having self-lubricating performance owing to dispersion of graphite. And, it is preferable to disperse the above specific carbides, Mo and Mo—Fe compound in copper alloy phase finely. And, since the liquid-phase sintering temperature of the Fe—Cu based sintered material containing copper in an amount of a solid solubility limit or larger can be controlled by addition of alloy element which lowers a temperature at which copper alloy phase is formed into a liquid phase, it becomes possible to lower sintering temperatures.

Figure 14:
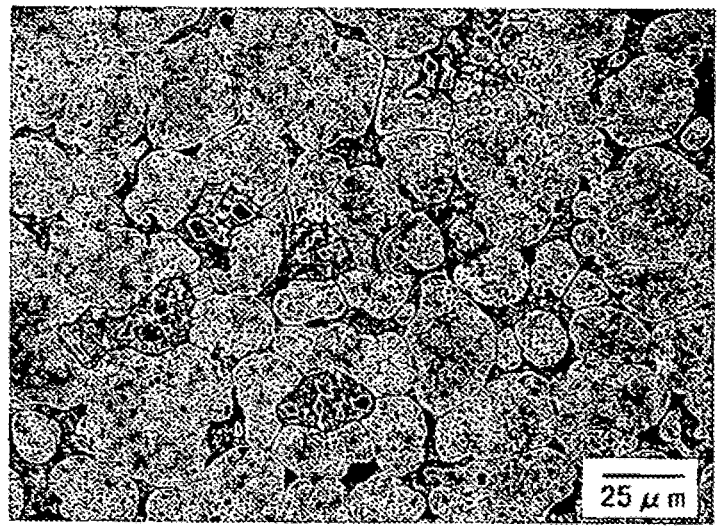
FIG. 14 is a photograph showing a structure of No. 38 alloy sintered at 1200° C.
Figure 15:
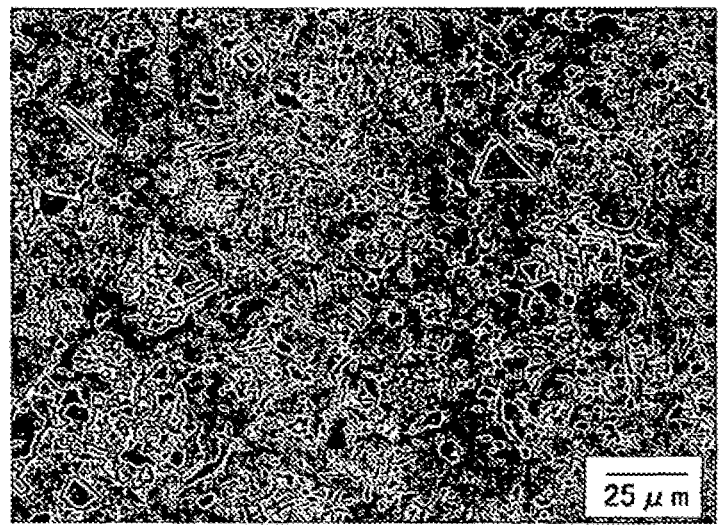
FIG. 15 is a photograph showing a structure of No. 39 alloy sintered at 1200° C.

No. 35 to No. 39 alloys in Table 2 were evaluated in action of addition of Mo powder. From the table, it is found that an addition of Mo in an amount of 10 wt % or less does not prevent sintering performance of the alloy. FIG. 14 is a photograph showing a structure of No. 38 alloy sintered at 1200° C. FIG. 15 is a photograph showing a structure of No. 39 alloy sintered at 1200° C. FIG. 14 shows that Mo is dispersed in Cu—Al—Fe alloy phase and FIG. 15 shows that Ni—Mo based intermetallic compound is formed with being dispersed. Both structures become preferable structure for improvement in seizing resistance.

No. 40 to No. 42 alloys were evaluated in effect of addition of TiH, Mn and Sn, which lower a melting point of copper alloy phase and strengthen copper alloy phase by precipitation of intermetallic compound. Table 2 shows that Sn lowers a suitable sintering temperature remarkably and Mn and Ti act for improvement in strength of copper alloy phase.

No. 26 to No. 34 alloys were evaluated in effect of addition of Ni which develops age-hardening performance with Al in Fe—Al—Cu alloy and is suitable for improvement in strength of copper alloy phase. As shown in Table 1, an addition of Ni in an amount of 20 wt % or less does not prevent sintering performance of the sintered material so much, however, when an addition amount of Ni is 10 wt % and also graphite is added, shown in No. 32 to No. 34 alloys, the sintering performance is remarkably suppressed. So, in Fe—Al—Cu alloy powder, it is preferable to alloy Ni previously.

No. 43 to No. 48 alloys were evaluated in a sintering ability in a case where fine high speed steel powder (M2) is added in Fe—Cu alloy powder containing a blended powder of Fe and copper and copper in an amount of a solid solubility limit or larger, and a structure of the sintered compact. Table 2 shows that Fe—Al—Cu based No. 46 to No. 48 alloys are excellent in sintering ability.

Figure 18:
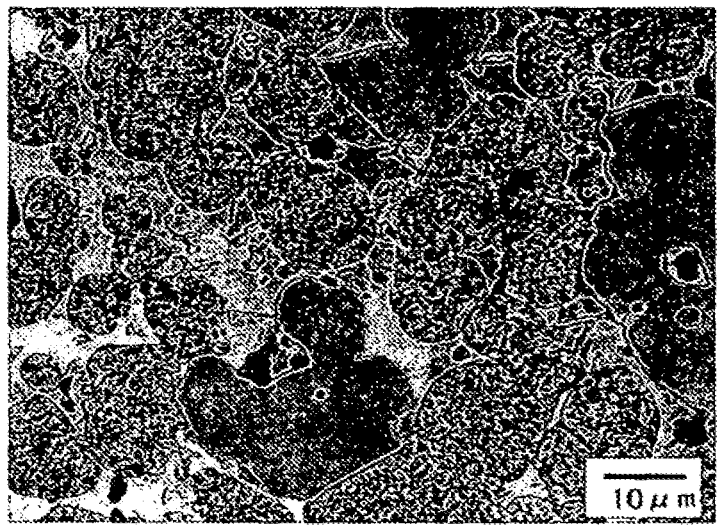
FIG. 18 is a photograph showing a sintered structure of No. 48 alloy sintered at 1150° C. for one hour.
Figure 19:
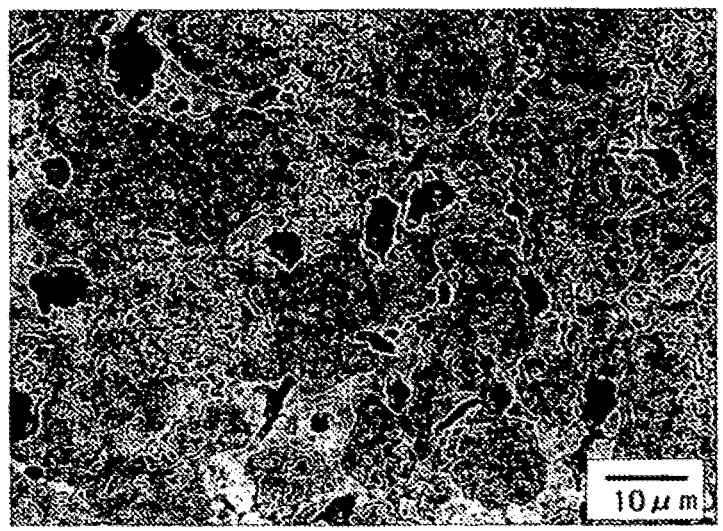
FIG. 19 is a photograph showing a sintered structure of No. 47 alloy sintered at 1150° C. for one hour.

FIG. 16 are photographs showing a sintered structure of No. 43 and No. 44 alloys sintered at 1150° C. for one hour. FIG. 17 is a photograph showing a sintered structure of No. 45 alloy sintered at 1150° C. for one hour. FIG. 18 is a photograph showing a sintered structure of No. 48 alloy sintered at 1150° C. for one hour. FIG. 19 is a photograph showing a sintered structure of No. 47 alloy sintered at 1150° C. for one hour.

In the sintered structure of No. 43 to No. 45 blended powder alloys, a high speed steel powder forms a solid solution and is homogenized as would not be discriminated. And, the added graphite forms a solid solution with Fe—Cu alloy phase and is transformed into a martensite phase (referring to FIGS. 16 and 17). On the contrary, in the sintered structure of sintered alloy using No. 48 Fe—Al—Cu alloy powder, as shown in FIG. 18, a hard high speed steel powder (white phase) is clearly dispersed in α-Fe—Al—Cu phase. In addition, it is found that the specific carbide particle which disperses in high speed steel powder essentially becomes a specific structure in which the particle is dispersed and precipitated in copper alloy phase with growing by dispersion at liquid-phase sintering. And, a dispersion of carbon and formation of a solid solution with α-Fe—Al—Cu phase from high speed steel are hardly proceeded.

In a case of No 47 alloy to which graphite of 1.2 wt % is added, it is found that a part of the graphite reacts with a high speed steel powder, enhancing sintering ability so as to connect particles of α-Fe—Al-copper alloy powder. And, a large amount of specific carbide is dispersed in portions where the high speed steel exists. However, since dispersion of carbon and formation of a solid solution with α-Fe—Al—Cu phase hardly proceeds, a large amount of graphite powder remains and is dispersed (referring to FIG. 19). The same results are confirmed in No. 64 to No. 66 alloys to which SUS440C alloy powder is added except for the high speed steel power.

Example 2

Figure 20:
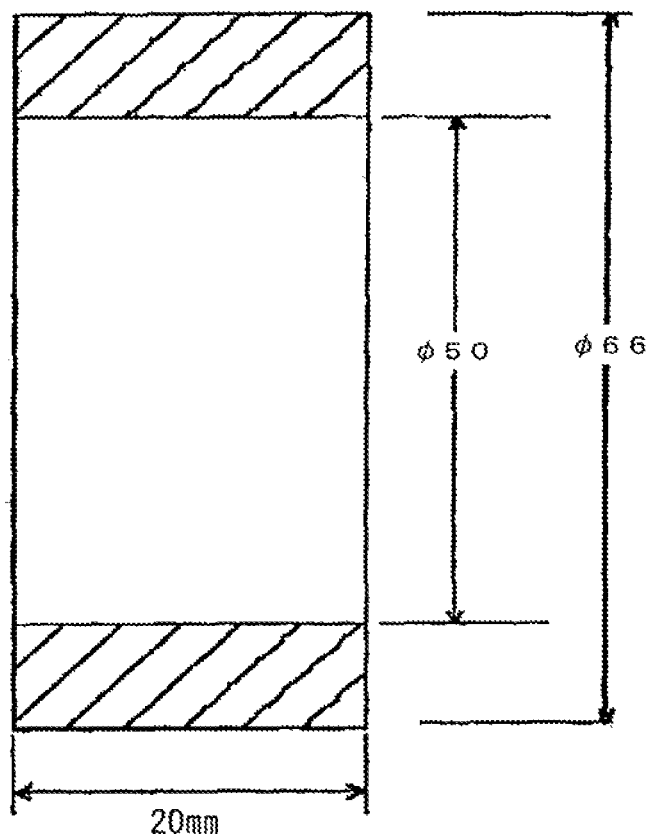
FIG. 20 is a drawing showing a bearing bushing for a bearing test.

In this Example, by using Fe—Cu based alloy powder shown in Table 3, each of copper powder of 10 wt %, graphite particle (KS6 as described above) of 1 to 9 wt %, granulated powder of KS6 (a grain size of 0.05 to 1 mm), Mo having an average grain size of 5 μm, $MoS_2$ and BN each having an average grain size of 15 μm, shown in Table 4, was mixed and formed into a test piece under the same condition as Example 1. And, each test piece was vacuum sintered at 1050 to 1200° C. and then machined into a bushing for bearing test as shown in FIG. 20. Then, the bushing was vacuum impregnated with engine oil of W30 and subjected to a bearing test. The bearing test was carried out under a condition where lubricating oil can be retained in 8% by volume or more. And, $MoS_2$ is previously mixed with graphite in equal amount (wt %) in order to prevent reaction of $MoS_2$ at sintering.

TABLE 3

COMPOSITION OF Fe—Cu ALLOY POWDER FOR BEARING TEST (wt %)

|   |   | C | Cu | Al | Si | Mn | Ni | Cr | Mo | W |
|---|---|---|---|---|---|---|---|---|---|---|
| (A) | Fe16Al25Cu | 0 | 24.8 | 15.9 | 0.11 | 0.31 | — | — | — | — |
| (B) | Fe20Cu0.6C | 0.62 | 20.2 | — | 0.15 | 0.28 | 2.51 | 0.21 | 0.51 | — |
| (C) | Fe5Al25Cu0.8C | 0.81 | 24.9 | 5.15 | 0.15 | 0.22 | — | 0.08 | — | — |
| (D) | Fe4.5Si20Cu3C | 3.21 | 20.1 | — | 3.12 | 0.35 | 4.1 | 1.57 | — | — |
| (E) | Fe15Cu4Cr5Mo6W0.85C | 0.91 | 15.6 | — | 0.48 | 0.43 | — | 4.22 | 5.31 | 6.01 |

TABLE 4

COMPOSITION OF Fe—Cu BASED SINTERED ALLOY FOR BEARING TEST (wt %)

| No. | (A) POWDER | (B) POWDER | (C) POWDER | (D) POWDER | (E) POWDER | M2 | 45 μm OR LESS 4600 STEEL POWDER | Fe25P | Cu(CE25) |
|---|---|---|---|---|---|---|---|---|---|
| A1 | Bal. | | | | | | | | 10 |
| A2 | Bal. | | | | | | | | 10 |
| A3 | Bal. | | | | | | | | 10 |
| A4 | Bal. | | | | | | | | 10 |
| A5 | Bal. | | | | | | | | 10 |
| A6 | Bal. | | | | | | | | 10 |
| A7 | Bal. | | | | | | | | 10 |
| A8 | Bal. | | | | | | | | 10 |
| A9 | Bal. | | | | | | | | 10 |
| A10 | Bal. | | | | | | | | 10 |
| A11 | Bal. | | | | | 15 | | | 10 |
| A12 | Bal. | | | | | 15 | | | 10 |
| A13 | Bal. | | | | | | 15 | | 10 |
| A14 | Bal. | | | | | | 15 | | 10 |
| A15 | | Bal. | | | | | | | 10 |
| A16 | | Bal. | | | | | | | 10 |
| A17 | | Bal. | | | | 15 | | | 10 |
| A18 | | Bal. | | | | | | | 10 |
| A19 | | | Bal. | | | | | | 10 |
| A20 | | | | Bal. | | | | | 10 |
| A21 | | | | Bal. | | | | | 10 |
| A22 | | | | Bal. | | | | | 10 |
| A23 | | | | | Bal. | | | | 15 |
| A24 | | | | | Bal. | | | | 15 |
| A25 | | | | | Bal. | | | | 15 |
| A26 | | | | | | 15 | Bal. | | 25 |
| A27 | 1050° C. | | | | | | Bal. | 2 | |

| No. | GRAPHITE (KS6) | GRANULATED GRAPHITE | MoS2 | Mo | BN | kg/cm2 P1 | kg/cm2 P2 |
|---|---|---|---|---|---|---|---|
| A1 | 0 | | | | | 650 | — |
| A2 | 1 | | | | | 800 | — |
| A3 | 2 | | | | | 1200 | 250 |
| A4 | 4 | | | | | 1650 | 700 |
| A5 | 6 | | | | | 1800 | 1000 |
| A6 | 8 | | | | | 1800 | 1600 |
| A7 | 10 | | | | | 1600 | 1200 |
| A8 | 2 | | 2 | | | 1800 | 800 |
| A9 | 2 | | | 10 | | 1800 | 400 |
| A10 | 0 | | | | 4 | 1800 | 850 |
| A11 | 0 | | | | | 850 | — |
| A12 | 4 | | | | | 1800 | 850 |
| A13 | 0 | | | | | 800 | — |
| A14 | 4 | | | | | 1800 | 750 |
| A15 | 0 | | | | | 200 | — |
| A16 | 4 | | | | | 950 | 350 |
| A17 | 4 | | | | | 1200 | 500 |
| A18 | 3 | | 2 | | | 1800 | 1000 |
| A19 | 4 | | | | | 1600 | 600 |
| A20 | 0 | | | | | 450 | — |
| A21 | 2 | | | | | 1000 | 450 |

TABLE 4-continued

COMPOSITION OF Fe—Cu BASED SINTERED ALLOY FOR BEARING TEST (wt %)

| | | | | | |
|---|---|---|---|---|---|
| A22 | 4 | | 1800 | 800 | |
| A23 | 0 | | 500 | — | |
| A24 | 2 | | 1000 | 300 | |
| A25 | 4 | | 1400 | 600 | |
| A26 | 0.8 | | 350 | — | |
| A27 | 0.8 | 10 | 800 | 450 | Cu—20Sn INFILTRATION |

Figure 21:
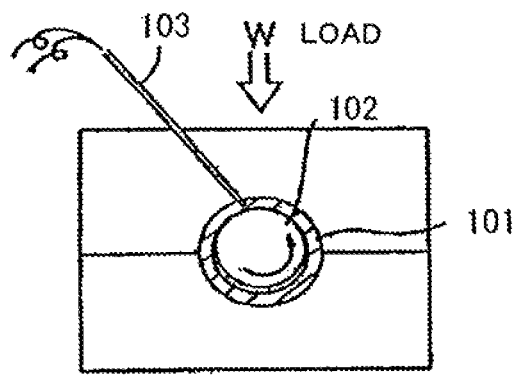
FIG. 21 is a drawing schematically showing a test equipment for the bearing test.

In the bearing test, a test equipment shown in FIG. 21 was used in which a bearing axis 102 is arranged in the inside of a bearing bushing 101 shown in FIG. 20 fixed to the equipment. And, the bearing axis 102 is oscillated with changing surface pressure applied to between the bearing bushing 101 and the bearing axis 102 by changing load applied to the bearing bushing 101 from upper side. The bearing axis 102 has an outer diameter smaller than an inner diameter of the bearing bushing 101 and is corresponded to an outer diameter of an actually used bearing device. And, the bearing axis 102 is made by induction hardening and tempering a surface of S55C carbon steel and adjusted so as to have surface hardness of HRC55. Setting an oscillating angle of the bearing axis 102 to 160°, oscillating for 2000 cycle is repeated every surface pressure while the surface pressure being increased by 50 kgf/cm$^2$. And, a surface pressure just before friction coefficient will rise suddenly over 0.25 is determined as a limit surface pressure for evaluation. The friction coefficient is obtained using a correlation between temperature of heat generated from the beating bushing 101 by friction, the temperature being measured by a thermo couple 103, and friction coefficient. A maximum surface pressure is 1800 kgf/cm$^2$ and an average slipping rate of the bearing axis 102 to the bearing bushing 101 is 0.8 m/min.

Table 4 shows the limit surface pressure at its end, and P1 shows a limit surface pressure under presence of oil retaining and P2 shows a limit surface pressure under no presence of oil retaining. Totally, retaining of oil improves seizing resistance remarkably.

From the results of limit surface pressures of A1 to A7 alloys in Table 4, it is found that an addition of graphite in an mount of 1 wt % or larger begins to develop self-lubricating performance and an addition of graphite of 2 wt % or larger improves seizing resistance remarkably. An addition of graphite of 10 wt % or larger begins to deteriorate seizing resistance slightly because of less of strength of sintered compact.

From the results of A8 to A10 alloys, it is found that an addition of MoS$_2$ and BN which have more excellent solid lubricating performance than graphite more improves seizing, resistance, especially, limit surface pressure under P2 condition (no oil retaining). And, Mo in A9 alloy, which is added as solid lubricant in order to prevent deteriorating of strength of sintered sliding material, improves seizing resistance of oil retaining sintered material remarkably.

And, from the results of A11 to A14 alloys, it is found that improvement in seizing resistance by addition of high speed steel powder is admitted in a oil retaining sintered material remarkably as well as Mo.

A15 to A18 alloys have a metal substrate of Fe—Cu—C based martensite phase; A19 alloy has a metal substrate of Fe—Cu—Al—C based martensite phase; A20 to A22 alloys have a metal substrate of Fe—Cu—Si—C based martensite phase in which fine graphite is precipitated; and A23 to A25 alloys have a metal substrate of Fe—Cu—Cr—Mo—W—V—C based martensite phase in which fine M$_6$C type and MC type specific carbides are precipitated. From the results of limit surface pressure of each of A15 to A25 alloys, it is found that the limit surface pressure is significantly affected by the metal substrate. And, as seizing resistance of the metal substrate is improved, self-lubricating performance owing to solid lubricant such as graphite, MoS$_2$, BN and Mo is effectively developed. From viewpoint of improvement in abrasion resistance and strength of sintered material, the metal substrate is preferably a martensite phase. When conformability with counterpart sliding material becomes important, it is preferable to contain relatively soft α-Fe phase, such as (A) powder in Table 3, and carbon previously. And, it is also preferable to adjust hardness of metal substrate by subjecting pearlite, bainite and the martensite phases to a tempering treatment using heat treatment ability of (B), (C) and (D) powders.

The present invention is not limited to the embodiments and examples described above, but encompasses any and all variations without departing from the principles of the invention.

What is claimed is:

1. A method for producing a ferrous sintered sliding material containing copper in an amount of 5 wt % to 50 wt % and C in an amount of 1 wt % to 15 wt % comprising:
    preparing a first powder which is one of a ferrous alloy powder of Fe—Cu based alloy powder containing copper in an amount of 5 wt % to less than 50 wt % and Fe—Cu—C based alloy powder containing copper in an amount of 5 wt % to less than 50 wt % and C in an amount of larger than 0 wt % to 5 wt %, a second powder which is a graphite powder, and a third powder which is WS$_2$ powder coated with graphite based material;
    mixing the prepared powders;
    compacting the mixed powder to form a compact; and
    sintering the compact,
    wherein a total content of said second powder and said third powder is 1 wt % to 14 wt % of said mixed powder.

2. The method of claim 1, wherein said sintering operation includes liquid-phase sintering for generating copper alloy liquid phase composed of copper mainly and then sintering.

3. The method of claim 1, wherein each of said Fe—Cu based ally powder and Fe—Cu—C based alloy powder contains one or more elements selected from the group consisting of C, Si, Al, Mn, Ni, Cr, Mo, V, W, Co, Sn, Ca, Mg, Ag, Pb, S, P, N, B, Nb, Ti and Zr.

4. The method of claim 1, wherein said graphite powder has an average grain size of 1 μm to 50 μm smaller than each of said Fe—Cu based alloy powder and Fe—Cu—C based alloy powder, and said graphite powder is contained in an amount of 1 wt % to 10 wt % of said mixed powder.

5. The method of claim 1, wherein said preparing operation further includes preparing a principle powder of, or master alloy powder containing, one or more elements selected from the group consisting of Sn in an amount of 0.1 wt % to 5 wt %, Ti in an amount of 0.1 wt % to 5 wt %, Si in an amount of 0.1 wt % to 3 wt %, P in an amount of 0.1 wt % to 1.5 wt %, Mn in an amount of 0.1 wt % to 10 wt %, Ni in an amount of 10 wt % or less and Co in an amount of 1 wt % to 10 wt %.

\* \* \* \* \*